US011757670B2

(12) United States Patent
Schemers et al.

(10) Patent No.: US 11,757,670 B2
(45) Date of Patent: Sep. 12, 2023

(54) METHODS AND APPARATUSES FOR DETERMINING A USER STATUS AVATAR FOR RENDERING WITHIN A GROUP-BASED COMMUNICATION INTERFACE

(71) Applicant: Slack Technologies, LLC, San Francisco, CA (US)

(72) Inventors: Roland Schemers, Woodside, CA (US); James McPhail, Alameda, CA (US); Lydia Han, San Francisco, CA (US); San Oo, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 17/722,864

(22) Filed: Apr. 18, 2022

(65) Prior Publication Data
US 2022/0239517 A1    Jul. 28, 2022

Related U.S. Application Data

(63) Continuation of application No. 17/129,102, filed on Dec. 21, 2020, now Pat. No. 11,310,065, which is a continuation of application No. 16/263,691, filed on Jan. 31, 2019, now Pat. No. 10,897,370.

(51) Int. Cl.
| | |
|---|---|
| *G06F 15/16* | (2006.01) |
| *H04L 12/18* | (2006.01) |
| *G06Q 50/00* | (2012.01) |
| *H04L 51/043* | (2022.01) |
| *H04L 67/54* | (2022.01) |

(52) U.S. Cl.
CPC ......... *H04L 12/1831* (2013.01); *G06Q 50/01* (2013.01); *H04L 12/1818* (2013.01); *H04L 51/043* (2013.01); *H04L 67/54* (2022.05)

(58) Field of Classification Search
CPC .. H04L 12/1818; H04L 67/54; H04L 12/1831
See application file for complete search history.

(56) References Cited

U.S. PATENT DOCUMENTS

| | | | |
|---|---|---|---|
| 2004/0064567 A1* | 4/2004 | Doss | G06Q 10/063114 709/228 |
| 2015/0295878 A1* | 10/2015 | Bender | H04L 51/224 709/206 |
| 2018/0287982 A1 | 10/2018 | Draeger et al. | |

OTHER PUBLICATIONS

"Die, Email, Die! A Flickr Cofounder Aims to Cut us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013) 2 pages.
"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

(Continued)

*Primary Examiner* — Chirag R Patel
(74) *Attorney, Agent, or Firm* — Erise IP, P.A.

(57) ABSTRACT

Embodiments of the present disclosure provide methods, systems, apparatuses, and computer program products for programmatically determining a user status avatar that is configured for transmitting as renderable within a group-based communication interface of a group-based communication system.

20 Claims, 20 Drawing Sheets

(56) References Cited

OTHER PUBLICATIONS

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014) 8 pages.
Ernie Smith, "Picking up the Slack", Tedium, [online][retrieved May 9, 2019], Retrieved from the Internet: <URL: https://tedium.co/2017/10/17/irc-vs-slack-chat-history/>. (dated Oct. 17, 2017) 13 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014) 4 pages.
Matsumoto, T. et al., "Chocoa Communicator—A New Communication System Based on Awareness and Text Communications—", Fujitsu Sci. Tech. J., 36, 2, (Dec. 2000) 154-161.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014), 2 pages.
Michael Carney, "Slack is thriving on a cocktail of whimsy and great timing", Pandodaily, Lexisnexis, https://advance.lexis.com/api/pemnalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield on How Slack Became a $2.8 Billion Unicorn", Forbes, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

METHODS AND APPARATUSES FOR DETERMINING A USER STATUS AVATAR FOR RENDERING WITHIN A GROUP-BASED COMMUNICATION INTERFACE

RELATED APPLICATIONS

This patent application is a continuation application claiming priority benefit, with regard to all common subject matter, of U.S. patent application Ser. No. 17/129,102, filed Dec. 21, 2020, and entitled "METHODS AND APPARATUSES FOR DETERMINING A USER STATUS AVATAR FOR RENDERING WITHIN A GROUP-BASED COMMUNICATION INTERFACE," now U.S. Pat. No. 11,310,065 ("the '065 Patent"). The '065 Patent is a continuation application claiming priority benefit, with regard to all common subject matter, of U.S. patent application Ser. No. 16/263,691, filed Jan. 31, 2019, now U.S. Pat. No. 10,897,370, issued Jan. 19, 2021 ("the '370 Patent"). The identified earlier-filed patents are hereby incorporated by reference in their entirety into the present application.

TECHNOLOGICAL FIELD

Embodiments of the invention relate, generally, to determining a user status avatar, and more specifically, to programmatically determining a user status avatar for transmitting for rendering within a group-based communication interface of a group-based communication system based on a combination of user activity data log(s), user data object(s), validated user object(s), and/or location data.

BACKGROUND

Calendar applications or services are intended to allow users to monitor and keep track of scheduled activities. Email and messaging applications allow robust and instantaneous communication among users. Applicant has identified a number of deficiencies and problems associated with calendar, email, and messaging applications. Through applied effort, ingenuity, and innovation, many of these identified problems have been solved by developing solutions that are included in embodiments of the present disclosure, many examples of which are described in detail herein.

BRIEF SUMMARY

This specification relates to methods, systems, apparatuses, and computer program products for an apparatus configured to determine a user status avatar for transmitting for rendering within one or more groups and/or channels of a group-based communication system. The apparatus comprises at least a processor, and a memory associated with the processor having computer coded instructions therein, with the computer coded instructions configured to, when executed by the processor, cause the apparatus to programmatically determine a user status avatar that is configured for rendering within a group-based communication interface of a group-based communication system.

In an example embodiment, an apparatus is provided that comprises at least a processor, and a memory associated with the processor having computer coded instructions therein, with the computer coded instructions configured to, when executed by the processor, cause the apparatus to programmatically determine a user status avatar that is configured for rendering within a group-based communication interface of a group-based communication system. The computer program code instructions may be configured to, when executed, cause the apparatus to retrieve a user activity data log from a group-based communication repository. The user activity data log documenting user engagement with the group-based communication interface. The computer program code instructions may also be configured to, when executed, cause the apparatus to receive a user status data object from an external resource. The user status data object including external engagement data. The computer program code instructions may be further configured to, when executed, cause the apparatus to determine the user status avatar from a plurality of user status avatars based on the user activity data log and the user status data object.

In an example embodiment, the user status data object comprises a user data object from an external email resource. In such an embodiment, the user data object comprises email resource engagement data. In an example embodiment, the user status data object comprises a validated user data object from a validated external resource. In such an embodiment, the validated user data object comprises validated resource engagement data. In an example embodiment, the user status data object comprises an external resource user identifier. In an example embodiment, the computer program instructions may be configured to, when executed, cause the apparatus to associate the user status data object with the user activity data log based on the external resource user identifier. In an example embodiment, the computer program instructions may be configured to, when executed, cause the apparatus to transmit the user status avatar for rendering within a user profile interface of the group-based communication interface that is associated with the user activity data log.

In an example embodiment, the computer program instructions may also be configured to, when executed, cause the apparatus to receive avatar rendering settings and to transmit the user status avatar for rendering within the group-based communication interface based on the avatar rendering settings. In such an embodiment, the avatar rendering settings are configured to cause the apparatus to transmit the user status avatar to be rendered as viewable only to selected users of the group-based communication interface. In some embodiments, the avatar rendering settings are configured to cause the apparatus to transmit the user status avatar to be rendered as viewable only to selected channel users of the group-based communication interface.

In an example embodiment, the avatar rendering settings are configured to cause the apparatus to transmit the user status avatar for rendering within a second group-based communication interface. In some embodiments, the avatar rendering settings are configured to cause the apparatus to transmit the user status avatar to be rendered as viewable only to first selected users of the group-based communication interface and second selected users of the second group-based communication interface. In some embodiments, the avatar rendering settings are configured to cause the apparatus to transmit the user status avatar to be rendered as viewable only to first selected channel users of the group-based communication interface and second selected channel users of the second group-based communication interface. In some embodiments, the avatar rendering settings are configured to cause the apparatus to transmit the user status avatar to be rendered within the group-based communication interface for defined status period.

In some embodiments, the computer program instructions may also be configured to, when executed, cause the apparatus, upon the expiration of the defined status period, to retrieve a second user activity data log from the group-based communication repository, the second user activity data log documenting second user engagement with the group-based communication interface. The computer program instructions may be further configured to, when executed, cause the apparatus, upon the expiration of the defined status period, to receive a second user status data object from the external resource. The second user status data object comprises second external engagement data. The computer program instructions may be still further configured to, when executed, cause the apparatus, upon the expiration of the defined status period, to determine a replacement user status avatar from the plurality of user status avatars based on the second user activity data log and the second user status data object. The computer program instructions may also be configured to, when executed, cause the apparatus, upon the expiration of the defined status period, to transmit the replacement user status avatar for rendering within the group-based communication interface to replace the user status avatar.

In an example embodiment, the computer program instructions may also be configured to, when executed, cause the apparatus, upon the expiration of the defined status period, to receive selection input identifying a replacement user status avatar from the plurality of user status avatars and transmit the replacement user status avatar for rendering within the group-based communication interface to replace the user status avatar.

In an example embodiment, the user status avatar comprises an identification avatar component associated with the external resource used to determine the user status avatar. In some embodiments, the computer program instructions may also be configured to, when executed, cause the apparatus to retrieve a second user activity data log from the group-based communication repository, the second user activity data log documenting second user engagement with the group-based communication interface. The computer program instructions may be further configured to, when executed, cause the apparatus to receive a second user status data object from the external resource. The second user status data object comprises second external engagement data. The computer program instructions may be still further configured to, when executed, cause the apparatus to determine a replacement user status avatar from the plurality of user status avatars based on the second user activity data log and the second user status data object. The computer program instructions may also be configured to, when executed, cause the apparatus to transmit the replacement user status avatar for rendering within the group-based communication interface to replace the user status avatar.

In an example embodiment, the computer program instructions may also be configured to, when executed, cause the apparatus to receive selection input identifying a replacement user status avatar from the plurality of user status avatars and transmit the replacement user status avatar for rendering within the group-based communication interface to replace the user status avatar.

In an example embodiment, the external email resource comprises a calendar service and wherein the user data object comprises calendar data. In an example embodiment, the computer program instructions may also be configured to, when executed, cause the apparatus to receive geographic location data from a client device associated with the user activity data log and determine the user status avatar from the plurality of user status avatars based on the user activity data log, the geographic location data, and the user status data object. In some embodiments, the computer program instructions may also be configured to, when executed, cause the apparatus to receive contextual location data from a client device associated with the user activity data log and determine the user status avatar from the plurality of user status avatars based on the user activity data log, the contextual location data, and the user status data object.

In an example embodiment, a computer-implemented method is provided for programmatically determining a user status avatar for rendering within a group-based communication interface of a group-based communication system. The computer-implemented method may include retrieving a user activity data log from a group-based communication repository, the user activity data log documenting user engagement with the group-based communication interface. The computer-implemented method may also include receiving a user status data object from an external resource. The user status data object comprises external engagement data. The computer-implemented method may further include determining the user status avatar from a plurality of user status avatars based on the user activity data log and the user status data object.

In an example embodiment, the user status data object comprises a user data object from an external email resource. In such an embodiment, the user data object comprises email resource engagement data. In an example embodiment, the user status data object comprises a validated user data object from a validated external resource. In such an embodiment, the validated user data object comprises validated resource engagement data. In an example embodiment, the user status data object comprises an external resource user identifier. In some embodiments, the computer-implemented method may also include associating the user status data object with the user activity data log based on the external resource user identifier. In some embodiments, the computer-implemented method may also include transmitting the user status avatar for rendering within a user profile interface of the group-based communication interface that is associated with the user activity data log.

In an example embodiment, the computer-implemented method may also include receiving avatar rendering settings and transmitting the user status avatar for rendering within the group-based communication interface based on the avatar rendering settings. In some embodiments, the avatar rendering settings are configured to render the user status avatar as viewable only to first selected users of the group-based communication interface and second selected users of the second group-based communication interface. In an example embodiment, the avatar rendering settings are configured to render the user status avatar as viewable only to selected users of the group-based communication interface. In some embodiments, the avatar rendering settings are configured to render the user status avatar to be viewable only to selected channel users of the group-based communication interface.

In an example embodiment, the avatar rendering settings are configured to render the user status avatar as viewable within a second group-based communication interface. In such an embodiment, the avatar rendering settings are configured to render the user status avatar as viewable only to first selected channel users of the group-based communication interface and second selected channel users of the second group-based communication interface. In some embodiments, the avatar rendering settings are configured to render the user status avatar within the group-based communication interface for defined status period.

In some embodiments, the computer-implemented method may also include, upon the expiration of the defined status period, retrieving a second user activity data log from the group-based communication repository, the second user activity data log documenting second user engagement with the group-based communication interface. The computer-implemented method may also include, upon the expiration of the defined status period, receiving a second user status data object from the external resource. The second user status data object comprises second external engagement data. The computer-implemented method may also include, upon the expiration of the defined status period, determining a replacement user status avatar from the plurality of user status avatars based on the second user activity data log and the second user status data object. The computer-implemented method may also include, upon the expiration of the defined status period, transmitting the replacement user status avatar for rendering within the group-based communication interface to replace the user status avatar.

In an example embodiment, the computer-implemented method may also include, upon the expiration of the defined status period, receiving selection input identifying a replacement user status avatar from the plurality of user status avatars and transmitting the replacement user status avatar for rendering within the group-based communication interface to replace the user status avatar.

In an example embodiment, the user status avatar comprises an identification avatar component associated with the external resource used to determine the user status avatar. In some embodiments, the computer-implemented method may also include retrieving a second user activity data log from the group-based communication repository, the second user activity data log documenting second user engagement with the group-based communication interface. The computer-implemented method may also include receiving a second user status data object from the external resource. The second user status data object comprises second external engagement data. The computer-implemented method may also include determining a replacement user status avatar from the plurality of user status avatars based on the second user activity data log and the second user status data object. The computer-implemented method may also include transmitting the replacement user status avatar for rendering within the group-based communication interface to replace the user status avatar.

In an example embodiment, the computer-implemented method may also include receiving selection input identifying a replacement user status avatar from the plurality of user status avatars and transmitting the replacement user status avatar for rendering within the group-based communication interface to replace the user status avatar.

In an example embodiment, the external email resource comprises a calendar service and wherein the user data object comprises calendar data. In an example embodiment, the computer-implemented method may also include receiving geographic location data from a client device associated with the user activity data log and determining the user status avatar from the plurality of user status avatars based on the user activity data log, the geographic location data, and the user status data object. In some embodiments, the computer-implemented method may also include receiving contextual location data from a client device associated with the user activity data log and determining the user status avatar from the plurality of user status avatars based on the user activity data log, the contextual location data, and the user status data object.

In another example embodiment, an apparatus is provided for programmatically determining a user status avatar for rendering within a group-based communication interface of a group-based communication system. The apparatus may include means for retrieving a user activity data log from a group-based communication repository, the user activity data log documenting user engagement with the group-based communication interface. The apparatus may also include means for receiving a user status data object from an external resource. The user status data object comprises external engagement data. The apparatus may further include means for determining the user status avatar from a plurality of user status avatars based on the user activity data log and the user status data object.

In an example embodiment, the user status data object comprises a user data object from an external email resource. In such an embodiment, the user data object comprises email resource engagement data. In an example embodiment, the user status data object comprises a validated user data object from a validated external resource. In such an embodiment, the validated user data object comprises validated resource engagement data. In an example embodiment, the user status data object comprises an external resource user identifier. In some embodiments, the apparatus may also include means for associating the user status data object with the user activity data log based on the external resource user identifier. In an example embodiment, the apparatus may also include means for transmitting the user status avatar for rendering within a user profile interface of the group-based communication interface that is associated with the user activity data log.

In an example embodiment, the apparatus may also include means for receiving avatar rendering settings and transmitting the user status avatar for rendering within the group-based communication interface based on the avatar rendering settings. In such an embodiment, the avatar rendering settings are configured to cause the apparatus to transmit the user status avatar to be rendered as viewable only to selected users of the group-based communication interface. In some embodiments, the avatar rendering settings are configured to cause the apparatus to transmit the user status avatar to be rendered as viewable only to selected channel users of the group-based communication interface.

In an example embodiment, the avatar rendering settings are configured to cause the apparatus to transmit the user status avatar to be rendered within a second group-based communication interface. In some embodiments, the avatar rendering settings are configured to cause the apparatus to transmit the user status avatar to be rendered as viewable only to first selected users of the group-based communication interface and second selected users of the second group-based communication interface. In an example embodiment, the avatar rendering settings are configured to cause the apparatus to transmit the user status avatar to be rendered as viewable only to first selected channel users of the group-based communication interface and second selected channel users of the second group-based communication interface. In some embodiments, the avatar rendering settings are configured to cause the apparatus to transmit the user status avatar to be rendered within the group-based communication interface for defined status period.

In some embodiments, the apparatus may also include means for, upon the expiration of the defined status period, retrieving a second user activity data log from the group-based communication repository, the second user activity data log documenting second user engagement with the group-based communication interface. The apparatus may also include means for, upon the expiration of the defined status period, receiving a second user status data object from the external resource. The second user status data object comprises second external engagement data. The apparatus may also include means for, upon the expiration of the defined status period, determining a replacement user status avatar from the plurality of user status avatars based on the second user activity data log and the second user status data object. The apparatus may also include means for, upon the expiration of the defined status period, transmitting the replacement user status avatar for rendering within the group-based communication interface to replace the user status avatar.

In an example embodiment, the apparatus may also include means for, upon the expiration of the defined status period, receiving selection input identifying a replacement user status avatar from the plurality of user status avatars and transmitting the replacement user status avatar for rendering within the group-based communication interface to replace the user status avatar.

In an example embodiment, the user status avatar comprises an identification avatar component associated with the external resource used to determine the user status avatar. In some embodiments, the apparatus may also include means for retrieving a second user activity data log from the group-based communication repository, the second user activity data log documenting second user engagement with the group-based communication interface. The apparatus may also include means for receiving a second user status data object from the external resource. The second user status data object comprises second external engagement data. The apparatus may also include means for determining a replacement user status avatar from the plurality of user status avatars based on the second user activity data log and the second user status data object. The apparatus may also include means for transmitting the replacement user status avatar for rendering within the group-based communication interface to replace the user status avatar.

In an example embodiment, the apparatus may also include means for receiving selection input identifying a replacement user status avatar from the plurality of user status avatars and transmitting the replacement user status avatar for rendering within the group-based communication interface to replace the user status avatar.

In an example embodiment, the external email resource comprises a calendar service and wherein the user data object comprises calendar data. In an example embodiment, the apparatus may also include means for receiving geographic location data from a client device associated with the user activity data log and determining the user status avatar from the plurality of user status avatars based on the user activity data log, the geographic location data, and the user status data object. In some embodiments, the apparatus may also include means for receiving contextual location data from a client device associated with the user activity data log and determining the user status avatar from the plurality of user status avatars based on the user activity data log, the contextual location data, and the user status data object.

In another example embodiment, an apparatus is provided that comprises at least one processor and at least one non-transitory memory including computer program code instructions, the computer program code instructions configured to, when executed, cause the apparatus to programmatically determine a user status avatar that is configured for rendering within a group-based communication interface of a group-based communication system. The computer program code instructions may be configured to, when executed, cause the apparatus to retrieve a user activity data log from a group-based communication repository, the user data activity log documenting user engagement with the group-based communication interface. The computer program code instructions may also be configured to, when executed, cause the apparatus to receive at least one user data object from at least one external email resources. The at least one user data object comprises email resource engagement data. The computer program code instructions may be further configured to, when executed, cause the apparatus to receive at least one validated user data object from at least one validated external resource, the at least one validated user data object comprising validated resource engagement data. The computer program code instructions may be still further configured to, when executed, cause the apparatus to determine the user status avatar from a plurality of user status avatars based on the user activity data log and at least one of the: at least one validated user data object or the at least one user data objects.

In some embodiments, the at least one user data object and the at least one validated user data object comprises one or more external resource user identifiers. In an example embodiment, the computer program code instructions may also be configured to, when executed, cause the apparatus to associate the at least one user data object and the at least one validated data object with the user activity data log based on the one or more external resource user identifiers. In some embodiments, the computer program code instructions may also be configured to, when executed, cause the apparatus to transmit the user status avatar for rendering within a user profile interface of the group-based communication interface that is associated with the user activity data log.

In an example embodiment, the computer program code instructions may also be configured to, when executed, cause the apparatus to receive avatar rendering settings and to transmit the user status avatar for rendering within the group-based communication interface based on the avatar rendering settings. In some embodiments, the avatar rendering settings are configured to cause the apparatus to transmit the user status avatar to be rendered as viewable only to selected users of the group-based communication interface. In some embodiments, the avatar rendering settings are configured to cause the apparatus to transmit the user status avatar to be rendered as viewable only to selected channel users of the group-based communication interface.

In an example embodiment, the avatar rendering settings are configured to cause the apparatus to transmit the user status avatar for rendering within a second group-based communication interface. In some embodiments, the avatar rendering settings are configured to cause the apparatus to transmit the user status avatar to be rendered as viewable only to first selected users of the group-based communication interface and second selected users of the second group-based communication interface. In some embodiments, the avatar rendering settings are configured to cause the apparatus to transmit the user status avatar to be rendered as viewable only to first selected channel users of the group-based communication interface and second selected channel users of the second group-based communication interface.

In some embodiments, the avatar rendering settings are configured to cause the apparatus to transmit the user status avatar for rendering within the group-based communication interface for defined status period. In an example embodiment, the computer program code instructions may also be configured to, when executed, cause the apparatus, upon expiration of the defined status period, to retrieve a second user activity data log from the group-based communication repository, the second user activity data log documenting second user engagement with the group-based communication interface. The computer program code instructions may be further configured to, when executed, cause the apparatus, upon expiration of the defined status period, to receive at least one of an additional user data object from the at least one external email resource or an additional validated user data object from the at least one validated external resources. The at least one of an additional user data object or an additional validated user data object comprises at least one of an additional email resource engagement data or an additional validated resource engagement data. The computer program code instructions may be still further configured to, when executed, cause the apparatus, upon expiration of the defined status period, to determine a replacement user status avatar from the plurality of user status avatars based on the second user activity data log and at least one of the at least one of the additional user data object or the additional validated user data object. The computer program code instructions may also be configured to, when executed, cause the apparatus, upon expiration of the defined status period, to transmit the replacement user status avatar for rendering within the group-based communication interface to replace the user status avatar.

In an example embodiment, the computer program code instructions may also be configured to, when executed, cause the apparatus, upon expiration of the defined status period, to receive selection input identifying a replacement user status avatar from the plurality of user status avatars and transmit the replacement user status avatar for rendering within the group-based communication interface to replace the user status avatar. In some embodiments, the user status avatar comprises at least one identification avatar component associated with the at least one of the at least one external email resource or the at least one validated external resource used to determine the user status avatar.

In an example embodiment, the computer program code instructions may also be configured to, when executed, cause the apparatus to retrieve a second user activity data log from the group-based communication repository, the second user activity data log documenting second user engagement with the group-based communication interface. The computer program code instructions may be further configured to, when executed, cause the apparatus to receive at least one of an additional user data object from the at least one external email resource or an additional validated user data object from the at least one validated external resources. The at least one of an additional user data object or an additional validated user data object comprises at least one of an additional email resource engagement data or an additional validated resource engagement data. The computer program code instructions may be still further configured to, when executed, cause the apparatus to determine a replacement user status avatar from the plurality of user status avatars based on the second user activity data log and at least one of the at least one of the additional user data object or the additional validated user data object. The computer program code instructions may also be configured to, when executed, cause the apparatus to transmit the replacement user status avatar for rendering within the group-based communication interface to replace the user status avatar.

In an example embodiment, the computer program code instructions may also be configured to, when executed, cause the apparatus to receive selection input identifying a replacement user status avatar from the plurality of user status avatars and transmit the replacement user status avatar for rendering within the group-based communication interface to replace the user status avatar. In some embodiments, the at least one external email resource and the at least one validated external resource comprises one or more calendar services and wherein at least one of the at least one user data object or at least one validated user data object comprises calendar data.

In an example embodiment, the computer program code instructions may also be configured to, when executed, cause the apparatus to receive geographic location data from a client device associated with the user activity data log and determine the user status avatar from the plurality of user status avatars based on the user activity data log, the geographic location data, and at least one of the at least one user data object or the at least one validated user data object. In some embodiments, the computer program code instructions may also be configured to, when executed, cause the apparatus to receive contextual location data from a client device associated with the user activity data log and determine the user status avatar from the plurality of user status avatars based on the user activity data log, the contextual location data, and at least one of the at least one user data object or the at least one validated user data object.

In an example embodiment, at least one of the at least one validated user data object or the at least one user data object is given a different weight during the determination of the user status avatar. In some embodiments, the weight given to the at least one of the at least one validated user data object or the at least one user data object is based on at least one of the at least one external email resource or the at least one validated external resource that provided the at least one of the at least one validated user data object or the at least one user data object.

In another embodiment, a computer-implemented method is provided for programmatically determining a user status avatar that is configured for rendering within a group-based communication interface of a group-based communication system. The computer-implemented method may include retrieving a user activity data log from a group-based communication repository, the user activity data log documenting user engagement with the group-based communication interface. The computer-implemented method may also include receiving at least one user data object from at least one external email resources. The at least one user data object comprises email resource engagement data. The computer-implemented method may further include receiving at least one validated user data object from at least one validated external resource. The at least one validated user data object comprises validated resource engagement data. The computer-implemented method may still further include determining the user status avatar from a plurality of user status avatars based on the user activity data log and at least one of the: at least one validated user data object or the at least one user data objects.

In some embodiments, the at least one user data object and the at least one validated user data object comprises one or more external resource user identifiers. In an example embodiment, the computer-implemented method may also include associating the at least one user data object and the at least one validated data object with the user activity data log based on the one or more external resource user identifiers. In some embodiments, the computer-implemented method may also include transmitting the user status avatar for rendering within a user profile interface of the group-based communication interface that is associated with the user activity data log.

In an example embodiment, the computer-implemented method may also include receiving avatar rendering settings and transmitting the user status avatar for rendering within the group-based communication interface based on the avatar rendering settings. In some embodiments, the avatar rendering settings are configured to transmit the user status avatar to be rendered as viewable only to selected users of the group-based communication interface. In some embodiments, the avatar rendering settings are configured to transmit the user status avatar to be rendered as viewable only to selected channel users of the group-based communication interface.

In an example embodiment, the avatar rendering settings are configured to transmit the user status avatar to be rendered as viewable to a second group-based communication interface. In some embodiments, the avatar rendering settings are configured to transmit the user status avatar to be rendered as viewable only to first selected users of the group-based communication interface and second selected users of the second group-based communication interface. In some embodiments, the avatar rendering settings are configured to transmit the user status avatar to be rendered as viewable only to first selected channel users of the group-based communication interface and second selected channel users of the second group-based communication interface.

In some embodiments, the avatar rendering settings are configured to transmit the user status avatar for rendering within the group-based communication interface for defined status period. In an example embodiment, the computer-implemented method may also include, upon expiration of the defined status period, retrieving a second user activity data log from the group-based communication repository, the second user activity data log documenting second user engagement with the group-based communication interface. The computer-implemented method may further include, upon expiration of the defined status period, receiving at least one of an additional user data object from the at least one external email resource or an additional validated user data object from the at least one validated external resources. The at least one of an additional user data object or an additional validated user data object comprises at least one of an additional email resource engagement data or an additional validated resource engagement data. The computer-implemented method may still further include, upon expiration of the defined status period, determining a replacement user status avatar from the plurality of user status avatars based on the second user activity data log and at least one of the at least one of the additional user data object or the additional validated user data object. The computer-implemented method may also include, upon expiration of the defined status period, transmitting the replacement user status avatar for rendering within the group-based communication interface to replace the user status avatar.

In an example embodiment, the computer-implemented method may also include, upon expiration of the defined status period, receiving selection input identifying a replacement user status avatar from the plurality of user status avatars and transmitting the replacement user status avatar for rendering within the group-based communication interface to replace the user status avatar. In some embodiments, the user status avatar comprises at least one identification avatar component associated with the at least one of the at least one external email resource or the at least one validated external resource used to determine the user status avatar.

In an example embodiment, the computer-implemented method may also include retrieving a second user activity data log from the group-based communication repository, the second user activity data log documenting second user engagement with the group-based communication interface. The computer-implemented method may further include receiving at least one of an additional user data object from the at least one external email resource or an additional validated user data object from the at least one validated external resources. The at least one of an additional user data object or an additional validated user data object comprises at least one of an additional email resource engagement data or an additional validated resource engagement data. The computer-implemented method may still further include determining a replacement user status avatar from the plurality of user status avatars based on the second user activity data log and at least one of the at least one of the additional user data object or the additional validated user data object. The computer-implemented method may also include transmitting the replacement user status avatar for rendering within the group-based communication interface to replace the user status avatar.

In an example embodiment, the computer-implemented method may also include receiving selection input identifying a replacement user status avatar from the plurality of user status avatars and transmitting the replacement user status avatar for rendering within the group-based communication interface to replace the user status avatar. In some embodiments, the at least one external email resource and the at least one validated external resource comprises one or more calendar services and wherein at least one of the at least one user data object or at least one validated user data object comprises calendar data.

In an example embodiment, the computer-implemented method may also include receiving geographic location data from a client device associated with the user activity data log and determining the user status avatar from the plurality of user status avatars based on the user activity data log, the geographic location data, and at least one of the at least one user data object or the at least one validated user data object. In some embodiments, the computer-implemented method may also include receiving contextual location data from a client device associated with the user activity data log and determining the user status avatar from the plurality of user status avatars based on the user activity data log, the contextual location data, and at least one of the at least one user data object or the at least one validated user data object.

In an example embodiment, at least one of the at least one validated user data object or the at least one user data object is given a different weight during the determination of the user status avatar. In some embodiments, the weight given to the at least one of the at least one validated user data object or the at least one user data object is based on at least one of the at least one external email resource or the at least one validated external resource that provided the at least one of the at least one validated user data object or the at least one user data object.

In another embodiment, an apparatus is provided for programmatically determining a user status avatar that is configured for rendering within a group-based communication interface of a group-based communication system. The apparatus may include means for retrieving a user activity data log from a group-based communication repository, the user activity data log documenting user engagement with the group-based communication interface. The apparatus may also include means for receiving at least one user data object from at least one external email resources. The at least one user data object comprises email resource engagement data. The apparatus may further include means for receiving at least one validated user data object from at least one validated external resource. The at least one validated user data object comprises validated resource engagement data. The apparatus may still further include means for determining the user status avatar from a plurality of user status avatars based on the user activity data log and at least one of the: at least one validated user data object or the at least one user data objects.

In some embodiments, the at least one user data object and the at least one validated user data object comprises one or more external resource user identifiers. In an example embodiment, the apparatus may also include means for associating the at least one user data object and the at least one validated data object with the user activity data log based on the one or more external resource user identifiers. In some embodiments, the apparatus may also include means for transmitting the user status avatar for rendering within a user profile interface of the group-based communication interface that is associated with the user activity data log.

In an example embodiment, the apparatus may also include means for receiving avatar rendering settings and transmitting the user status avatar for rendering within the group-based communication interface based on the avatar rendering settings. In some embodiments, the avatar rendering settings are configured to cause the apparatus to transmit the user status avatar to be rendered as viewable only to selected users of the group-based communication interface. In some embodiments, the avatar rendering settings are configured to cause the apparatus to transmit the user status avatar to be rendered as viewable only to selected channel users of the group-based communication interface.

In an example embodiment, the avatar rendering settings are configured to cause the apparatus to transmit the user status avatar to be rendered as viewable to a second group-based communication interface. In some embodiments, the avatar rendering settings are configured to cause the apparatus to transmit the user status avatar to be rendered as viewable only to first selected users of the group-based communication interface and second selected users of the second group-based communication interface. In some embodiments, the avatar rendering settings are configured to cause the apparatus to transmit the user status avatar to be rendered as viewable only to first selected channel users of the group-based communication interface and second selected channel users of the second group-based communication interface.

In some embodiments, the avatar rendering settings are configured to cause the apparatus to transmit the user status avatar for rendering within the group-based communication interface for defined status period. In an example embodiment, the apparatus may also include means for, upon expiration of the defined status period, retrieving a second user activity data log from the group-based communication repository, the second user activity data log documenting second user engagement with the group-based communication interface. The apparatus may further include means for, upon expiration of the defined status period, receiving at least one of an additional user data object from the at least one external email resource or an additional validated user data object from the at least one validated external resources. The at least one of an additional user data object or an additional validated user data object comprises at least one of an additional email resource engagement data or an additional validated resource engagement data. The apparatus may still further include means for, upon expiration of the defined status period, determining a replacement user status avatar from the plurality of user status avatars based on the second user activity data log and at least one of the at least one of the additional user data object or the additional validated user data object. The apparatus may also include means for, upon expiration of the defined status period, transmitting the replacement user status avatar for rendering within the group-based communication interface to replace the user status avatar.

In an example embodiment, the apparatus may also include means for, upon expiration of the defined status period, receiving selection input identifying a replacement user status avatar from the plurality of user status avatars and transmitting the replacement user status avatar for rendering within the group-based communication interface to replace the user status avatar. In some embodiments, the user status avatar comprises at least one identification avatar component associated with the at least one of the at least one external email resource or the at least one validated external resource used to determine the user status avatar.

In an example embodiment, the apparatus may also include means for retrieving a second user activity data log from the group-based communication repository, the second user activity data log documenting second user engagement with the group-based communication interface. The apparatus may further include means for receiving at least one of an additional user data object from the at least one external email resource or an additional validated user data object from the at least one validated external resources. The at least one of an additional user data object or an additional validated user data object comprises at least one of an additional email resource engagement data or an additional validated resource engagement data. The apparatus may still further include means for determining a replacement user status avatar from the plurality of user status avatars based on the second user activity data log and at least one of the at least one of the additional user data object or the additional validated user data object. The apparatus may also include means for transmitting the replacement user status avatar for rendering within the group-based communication interface to replace the user status avatar.

In an example embodiment, the apparatus may also include means for receiving selection input identifying a replacement user status avatar from the plurality of user status avatars and transmitting the replacement user status avatar for rendering within the group-based communication interface to replace the user status avatar. In some embodiments, the at least one external email resource and the at least one validated external resource comprises one or more calendar services and wherein at least one of the at least one user data object or at least one validated user data object comprises calendar data.

In an example embodiment, the apparatus may also include means for receiving geographic location data from a client device associated with the user activity data log and determining the user status avatar from the plurality of user status avatars based on the user activity data log, the geographic location data, and at least one of the at least one user data object or the at least one validated user data object. In some embodiments, the apparatus may also include means for receiving contextual location data from a client device associated with the user activity data log and determining the user status avatar from the plurality of user status avatars based on the user activity data log, the contextual location data, and at least one of the at least one user data object or the at least one validated user data object.

In an example embodiment, at least one of the at least one validated user data object or the at least one user data object is given a different weight during the determination of the user status avatar. In some embodiments, the weight given to the at least one of the at least one validated user data object or the at least one user data object is based on at least one of the at least one external email resource or the at least one validated external resource that provided the at least one of the at least one validated user data object or the at least one user data object.

The details of one or more embodiments of the subject matter described in this specification are set forth in the accompanying drawings and the description below. Other features, aspects, and advantages of the subject matter will become apparent from the description, the drawings, and the claims.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
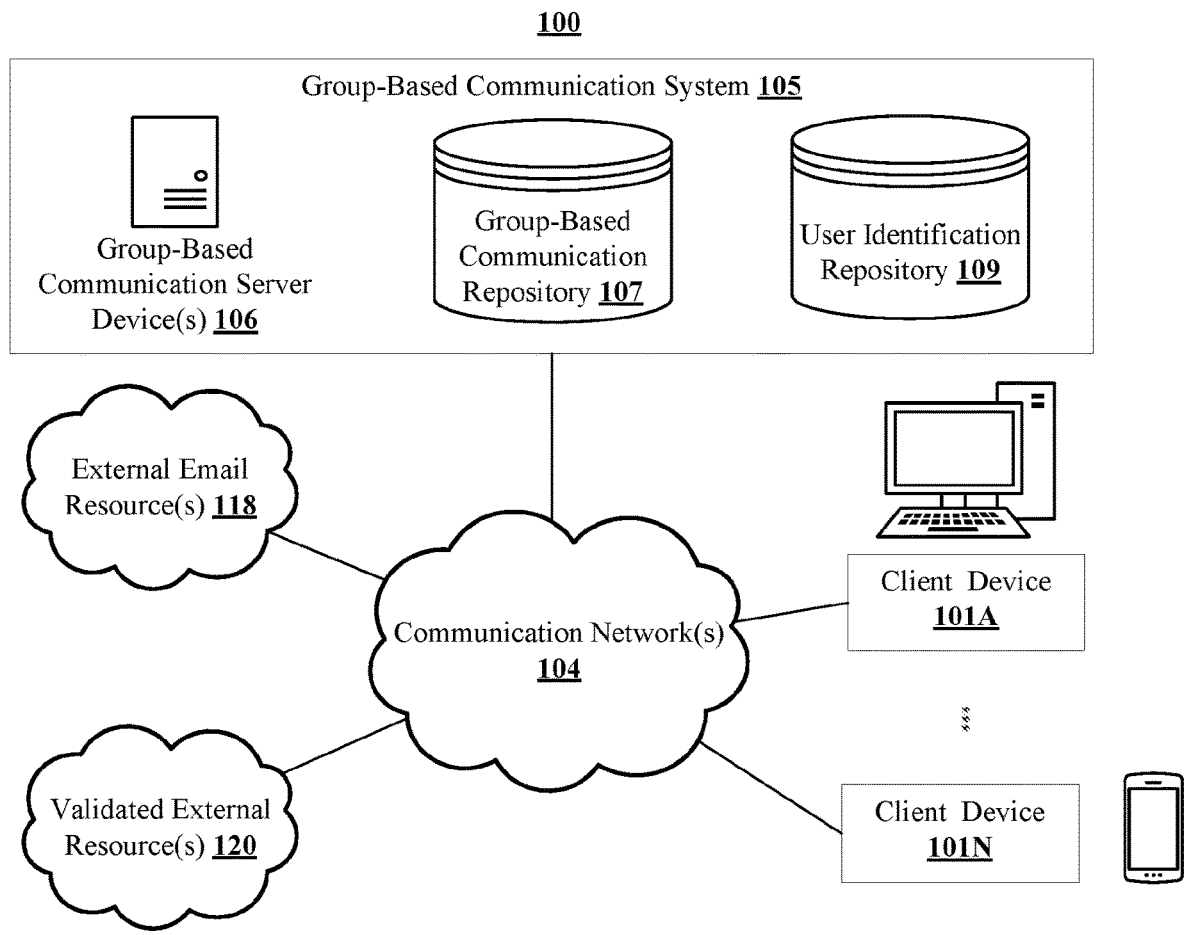
Figure 2:
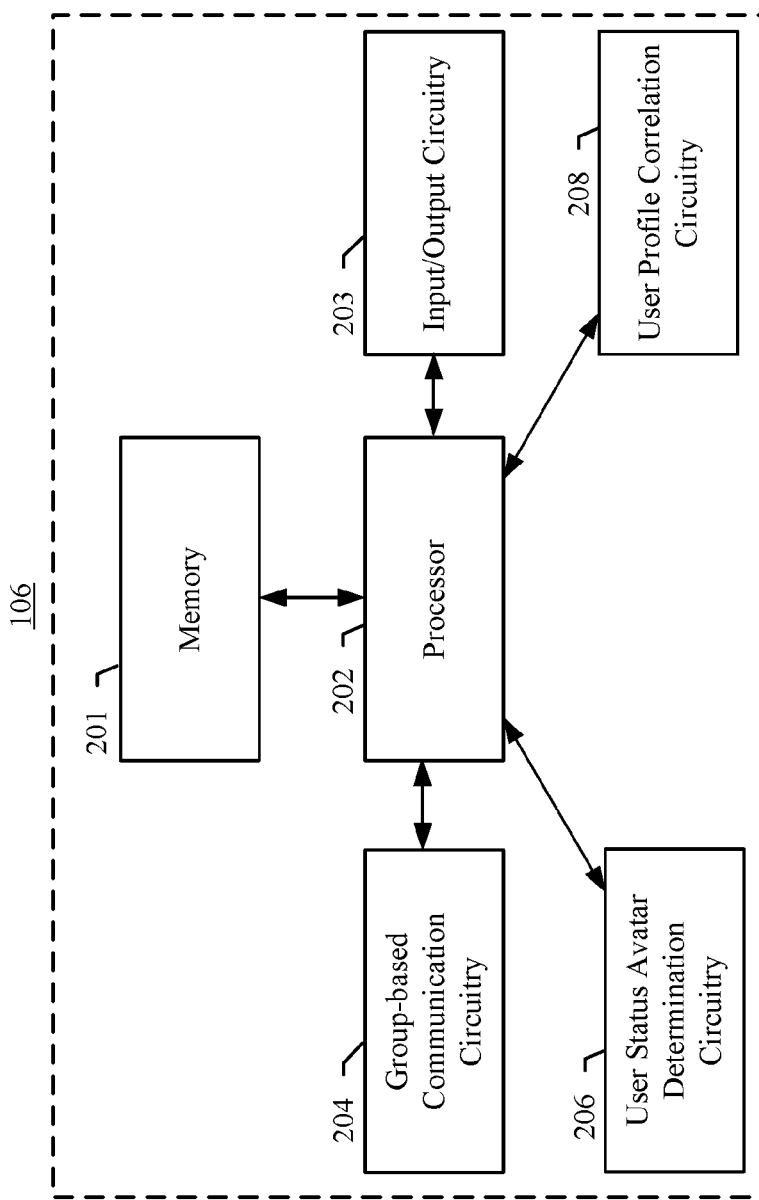
Figure 3:
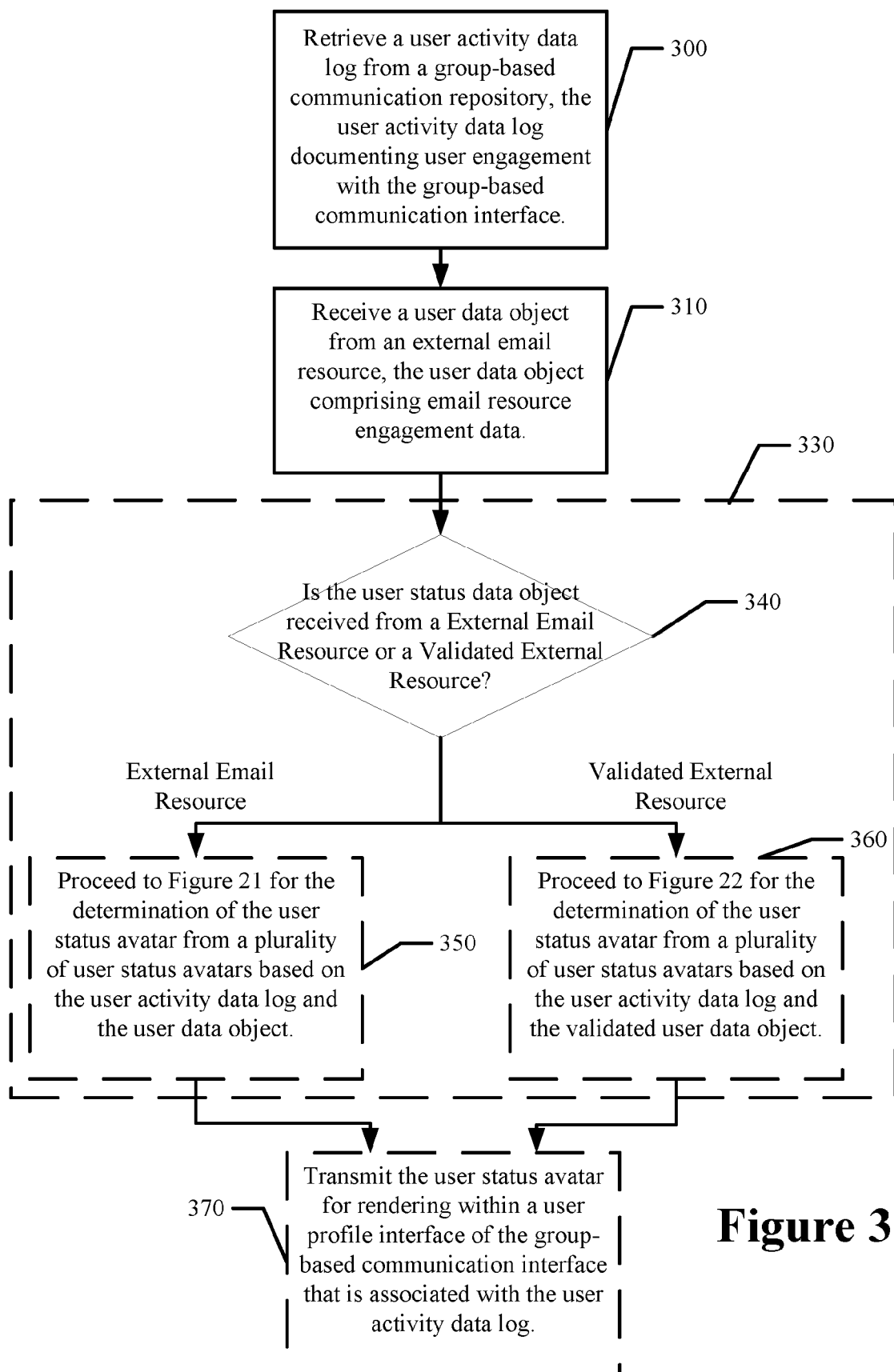
Figure 4:
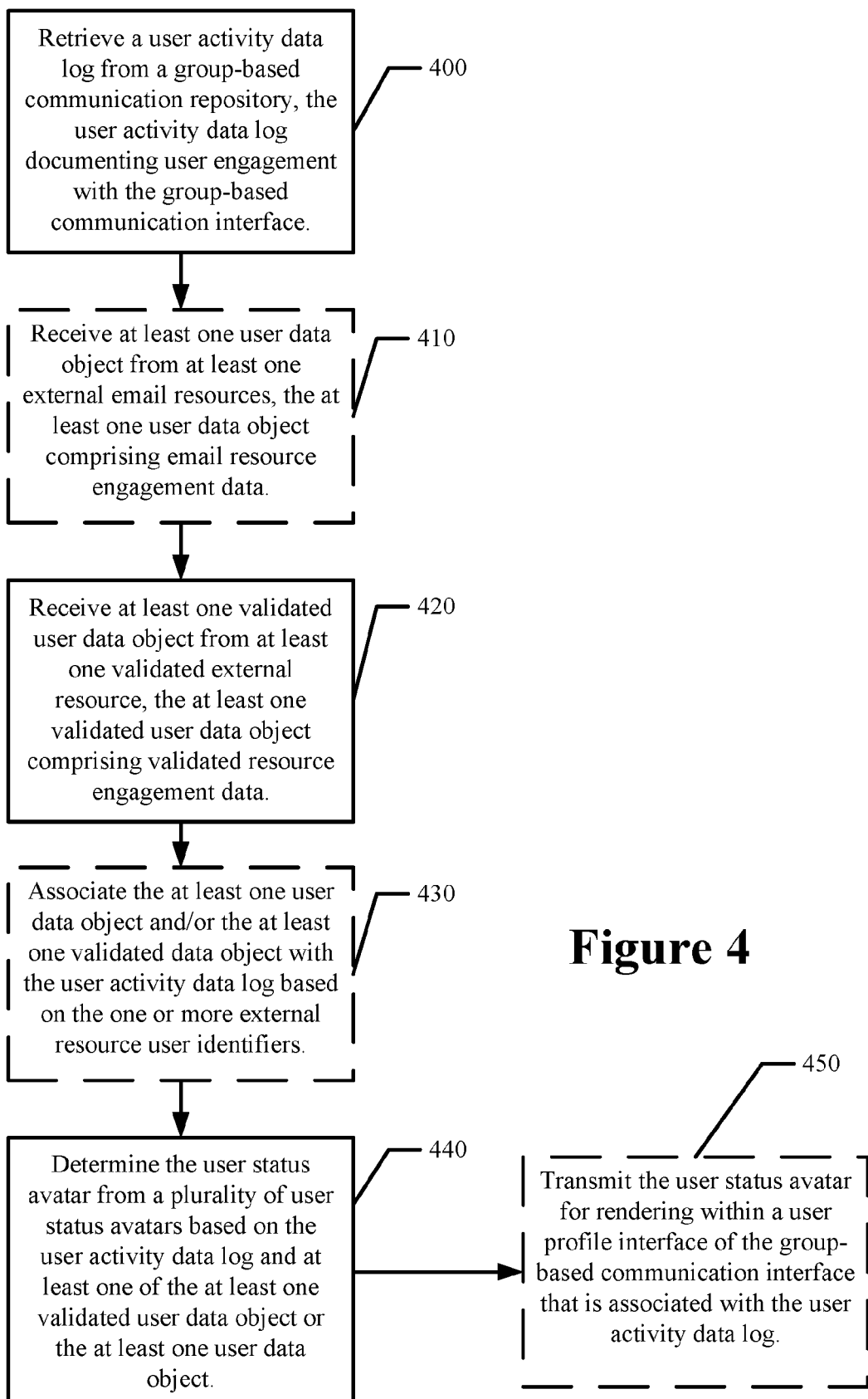
Figure 5:
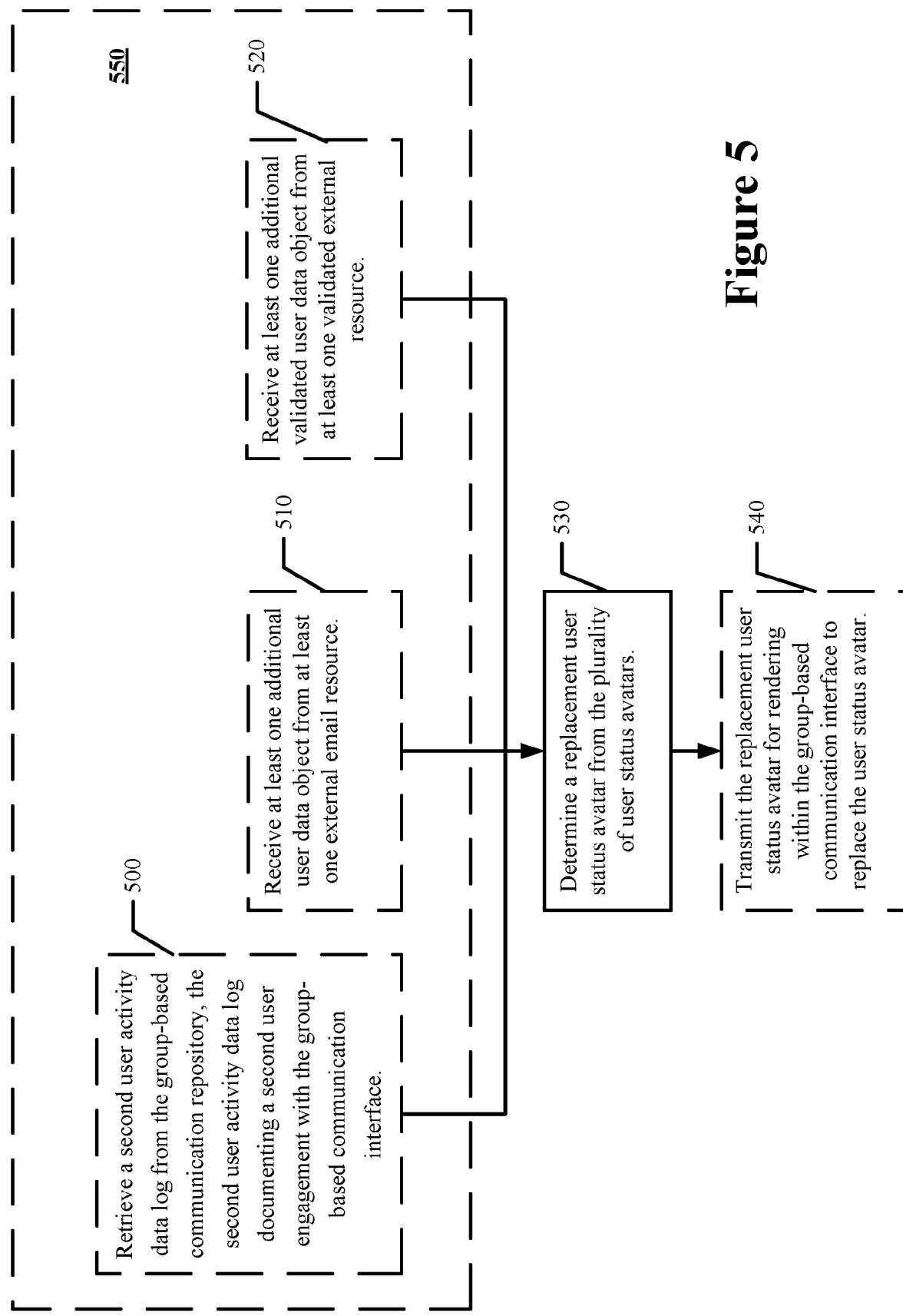
Figure 6:
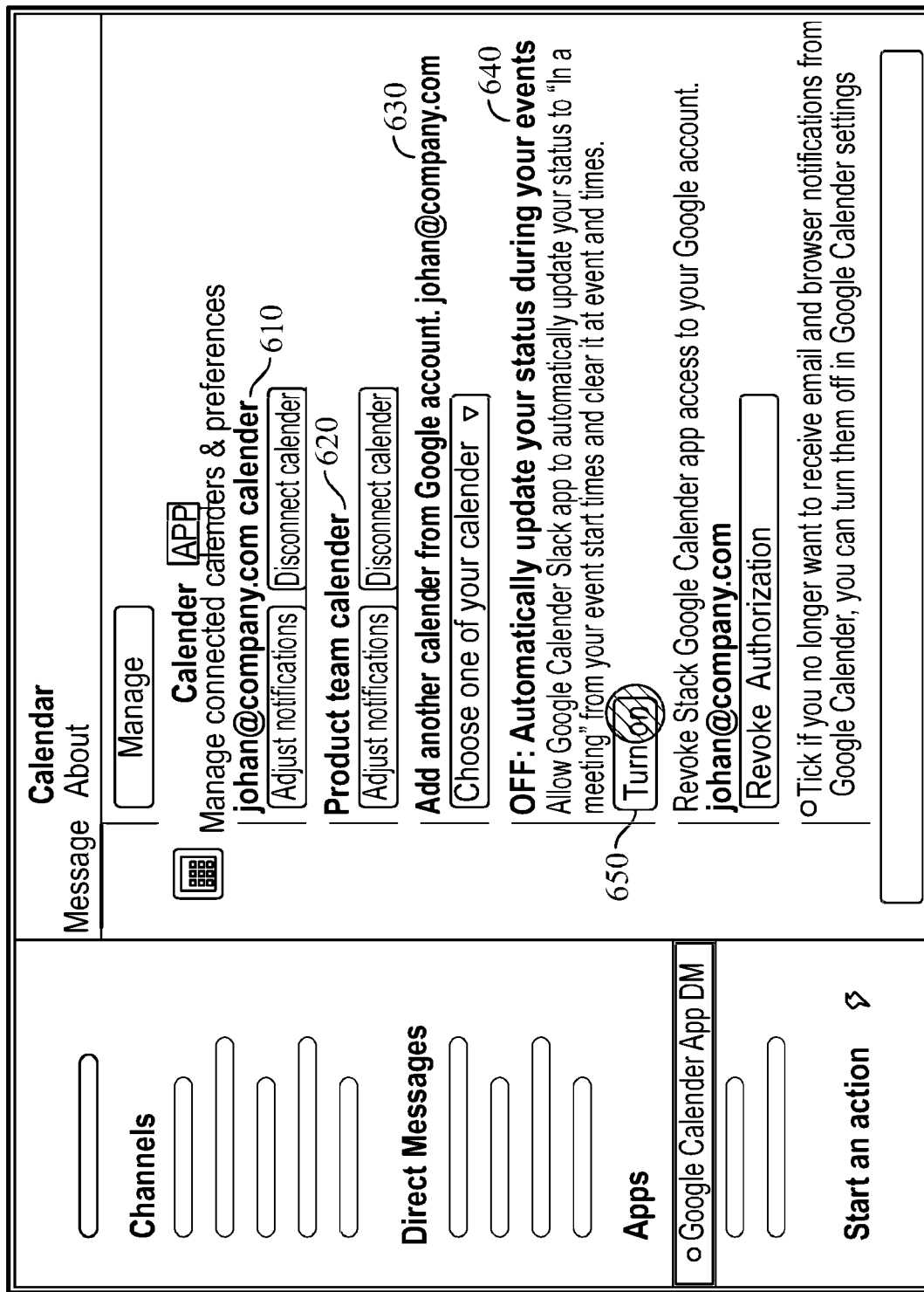
Figure 7:
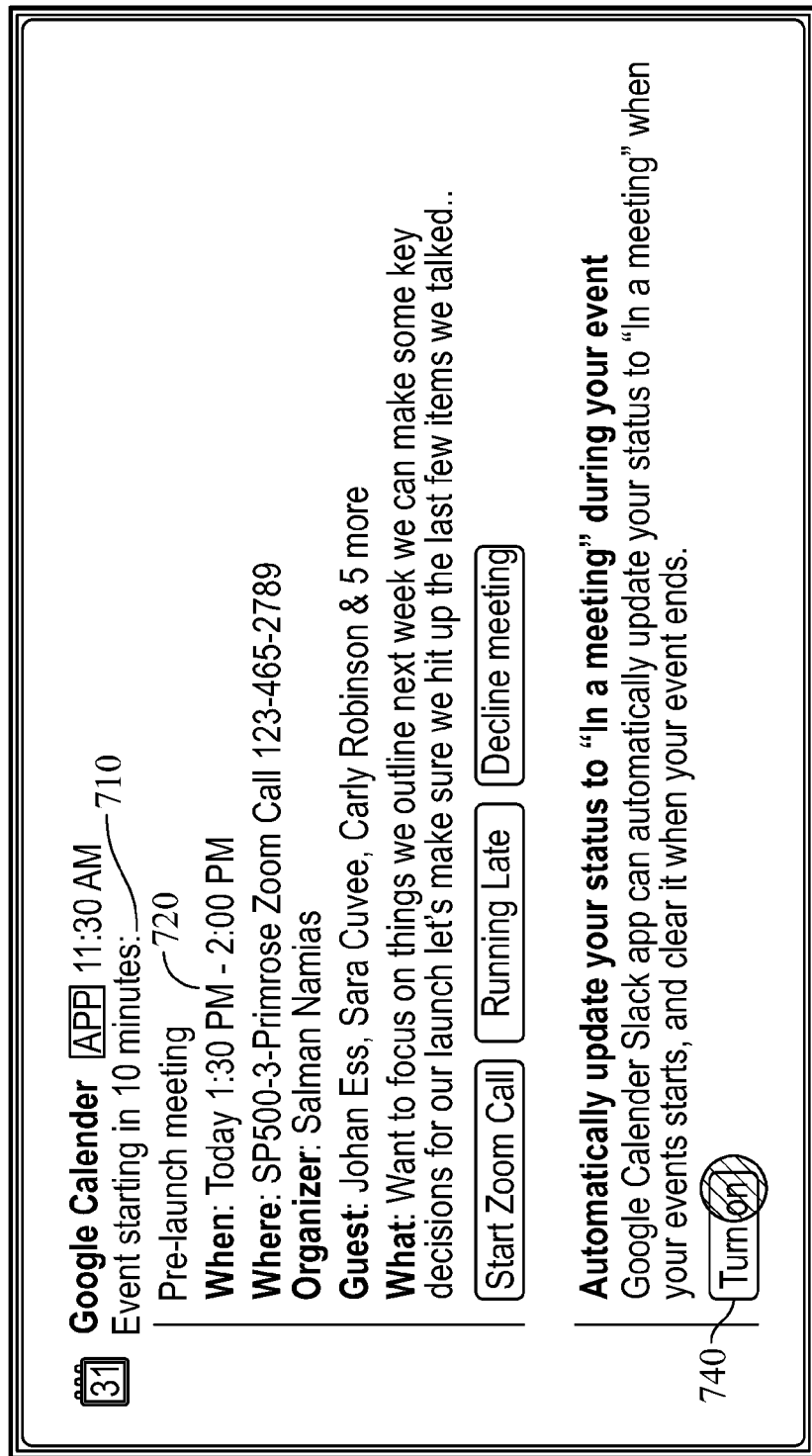
Figure 8:
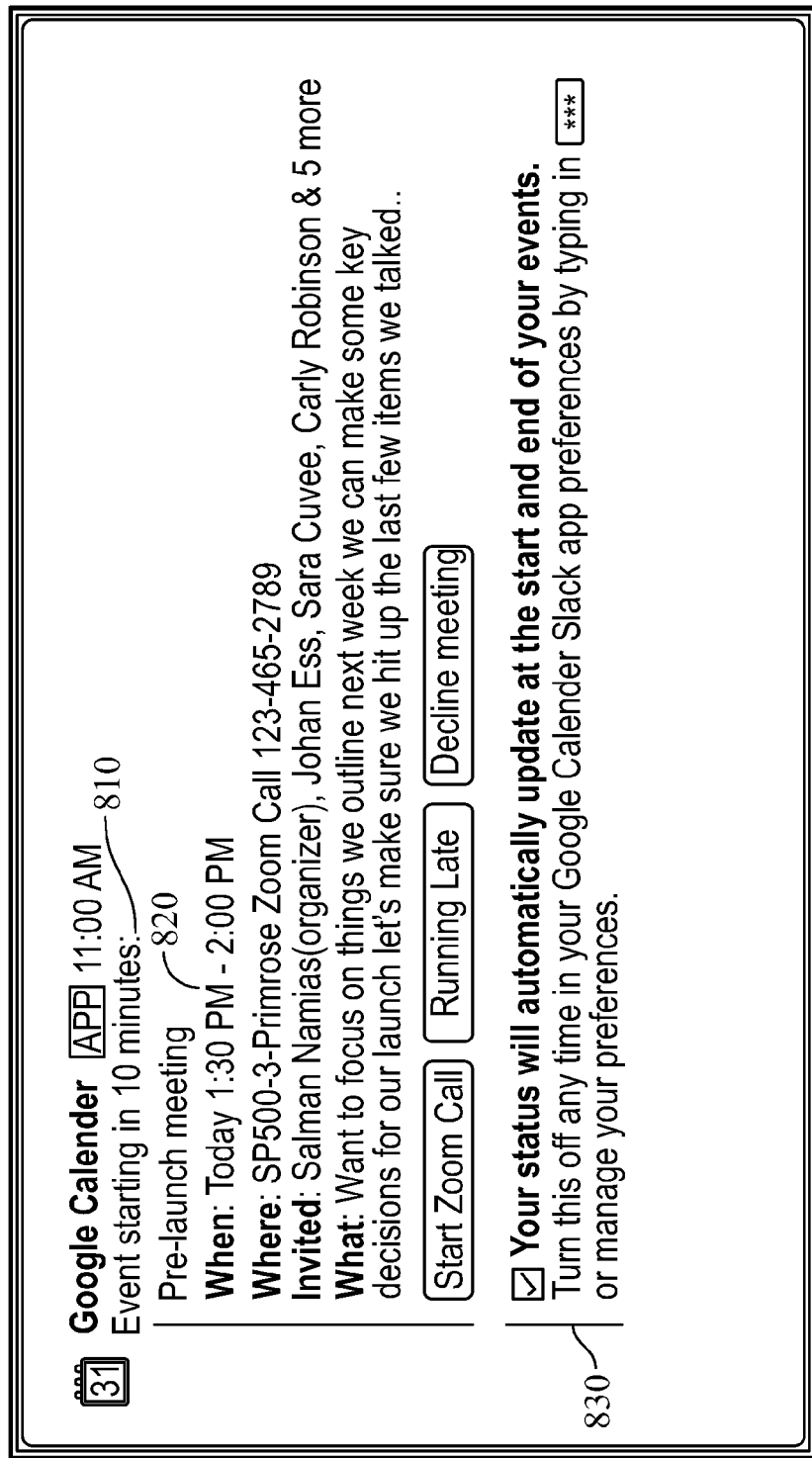
Figure 9:
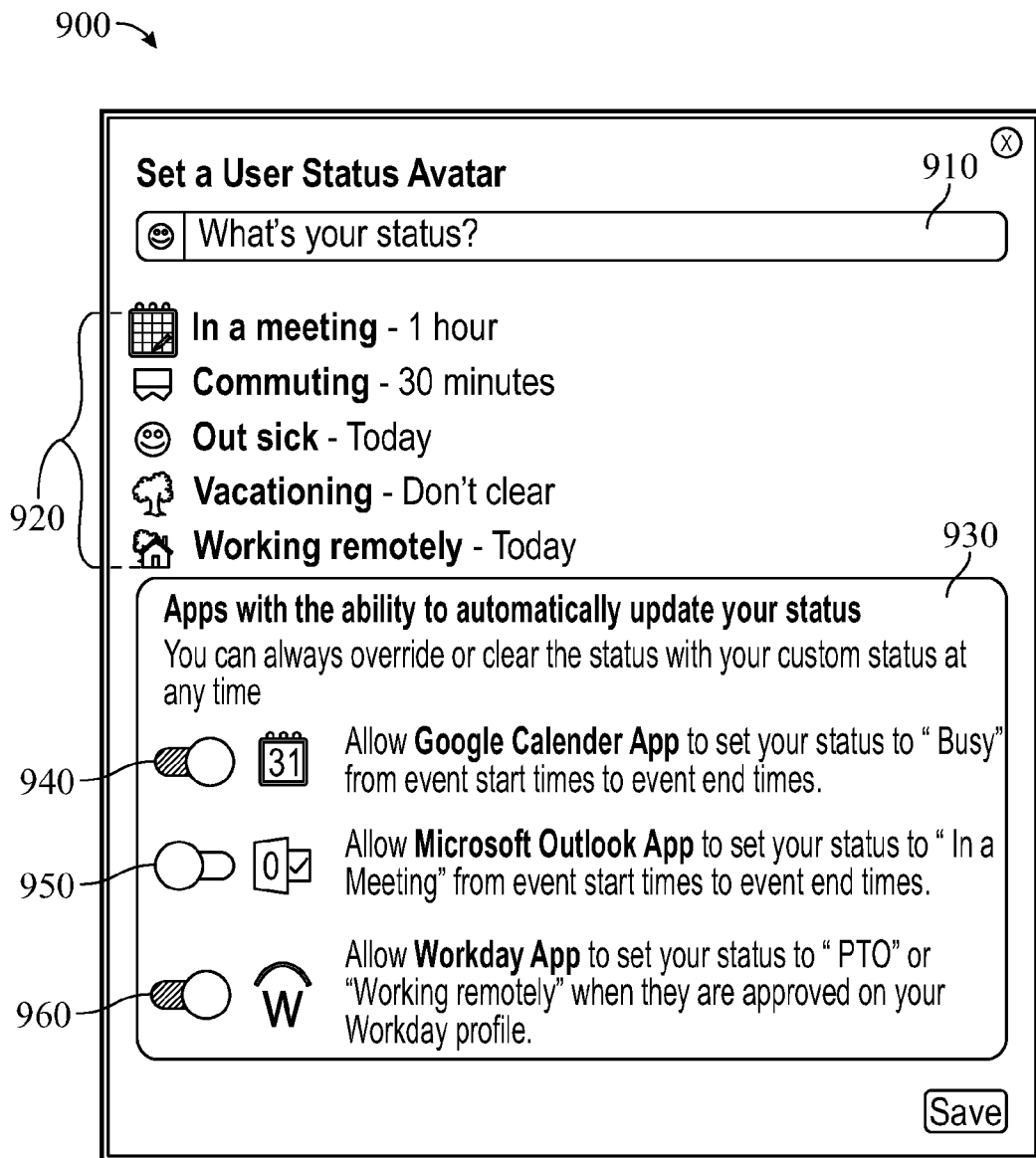
Figure 10:
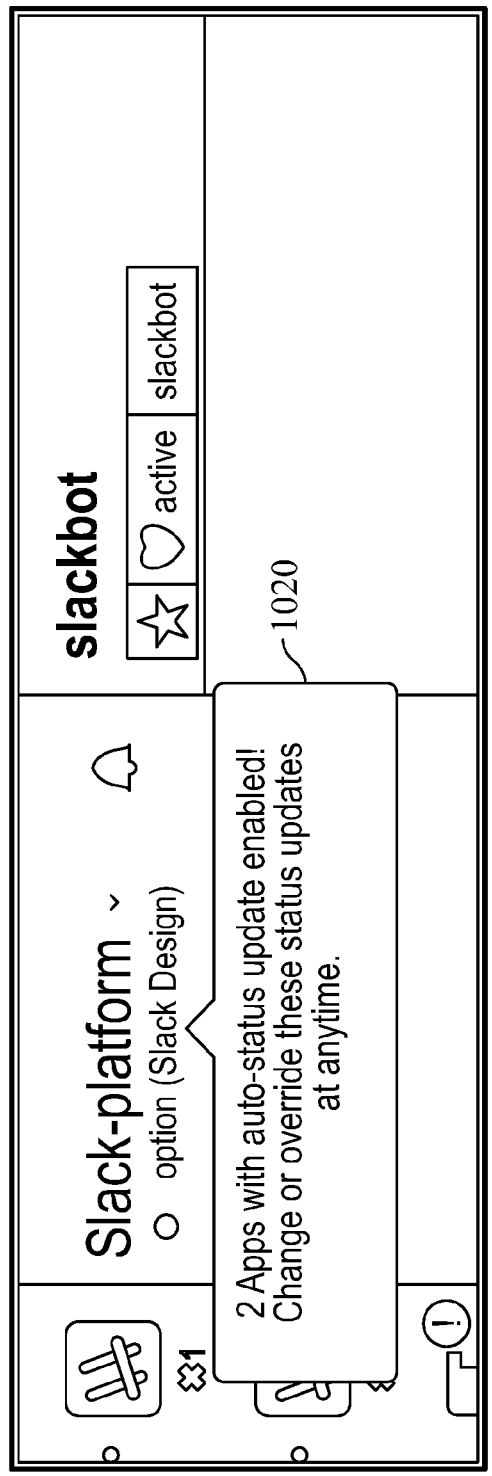
Figure 11:
Figure 12:
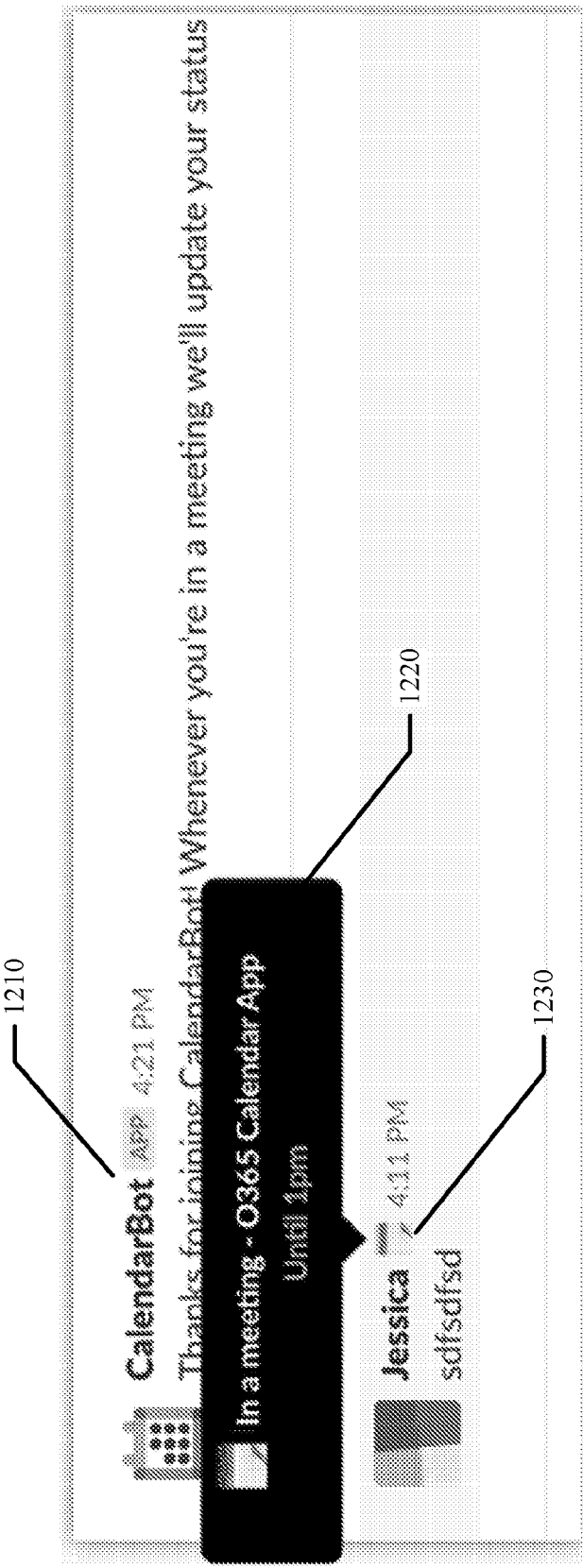
Figure 13:
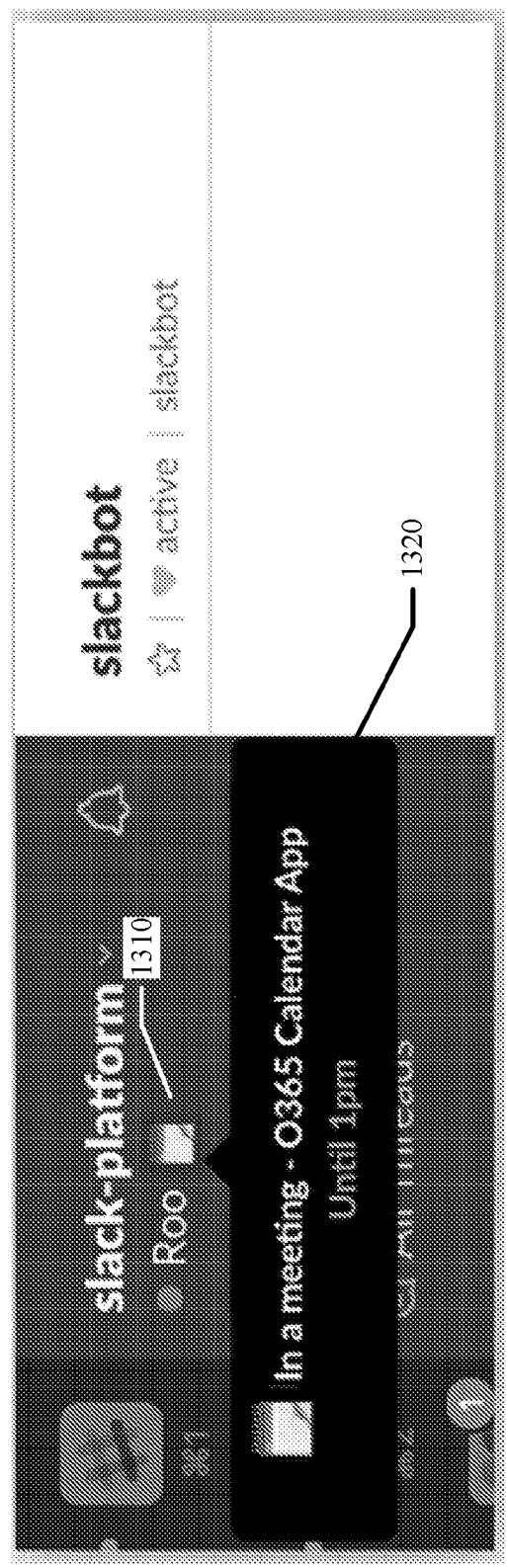
Figure 14:
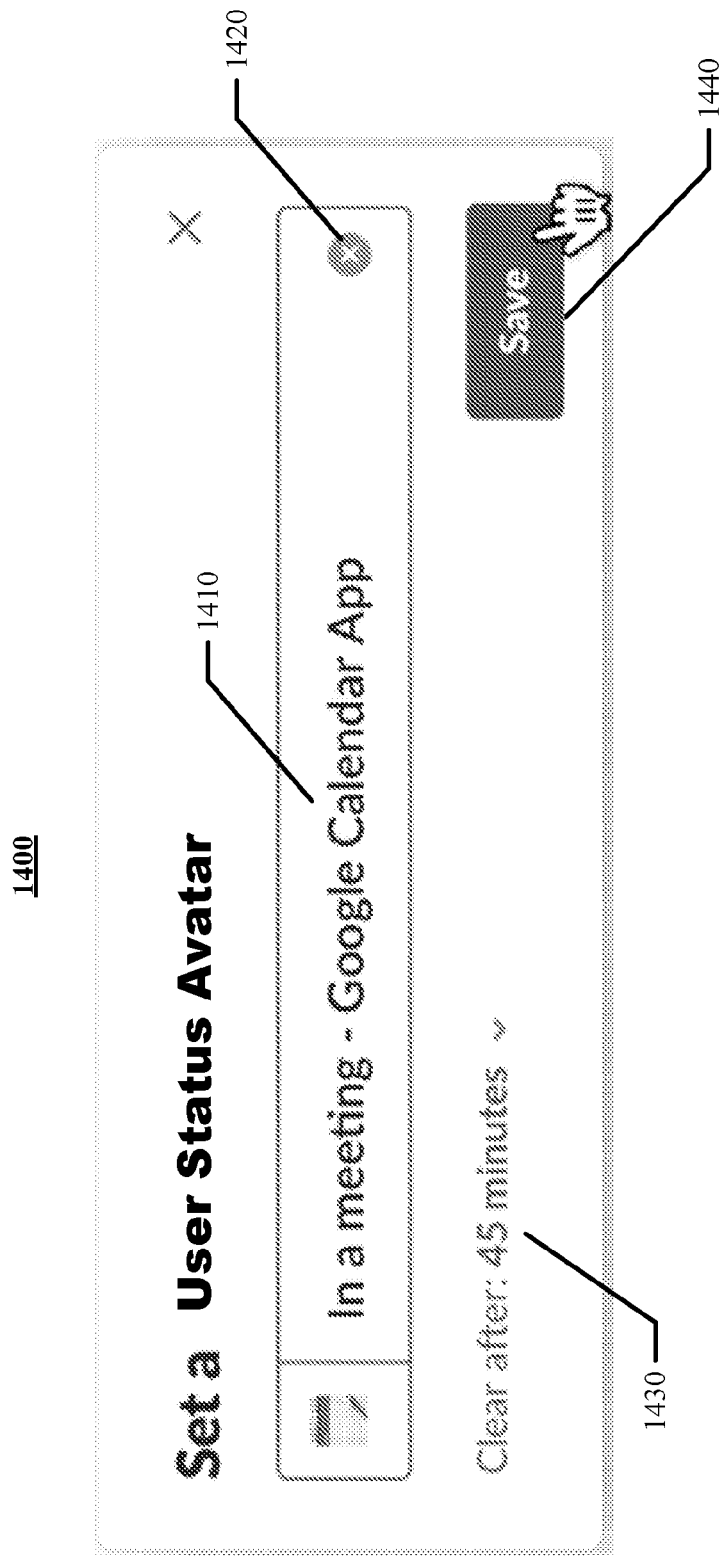
Figure 15:
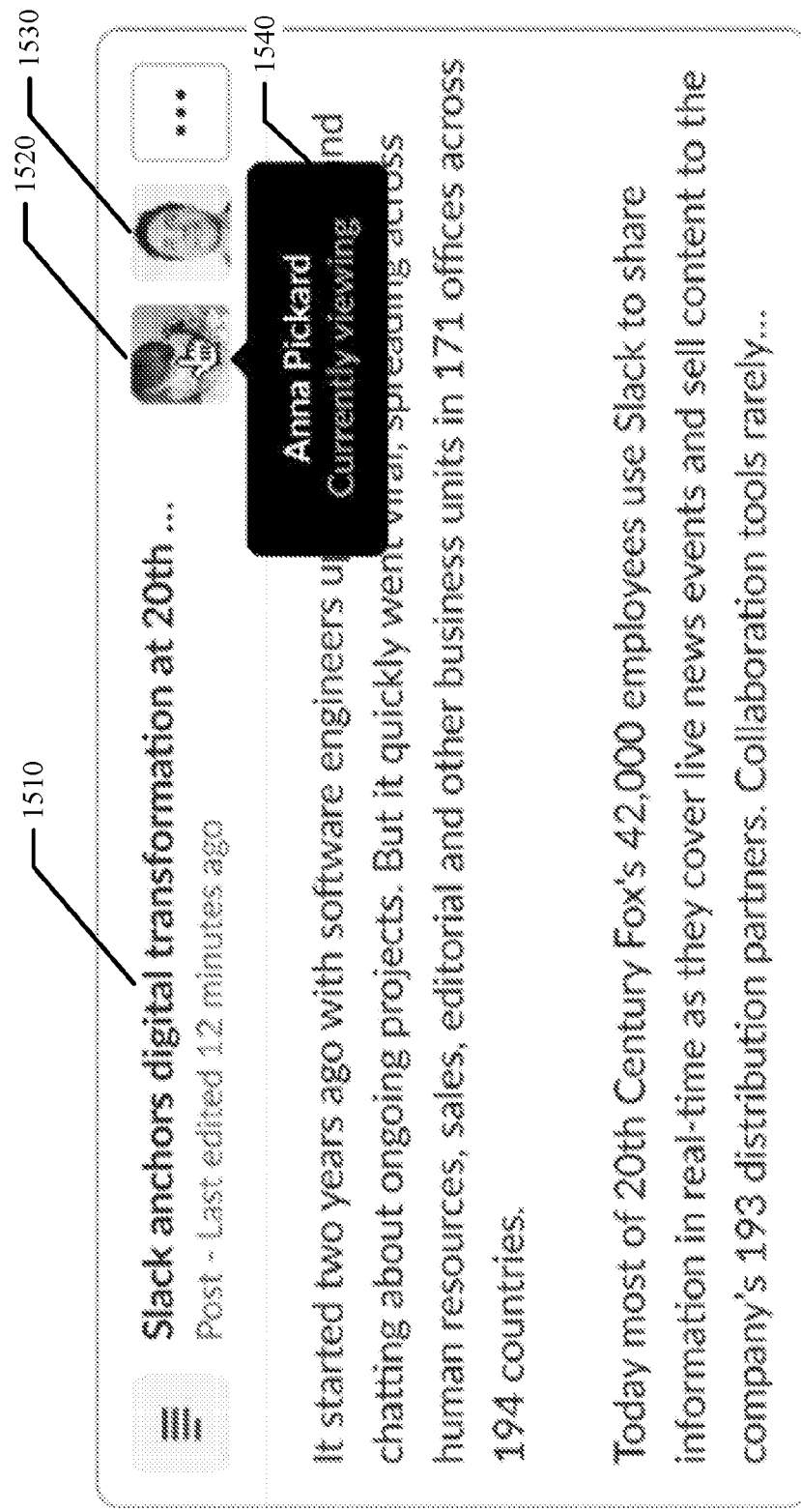
Figure 16:
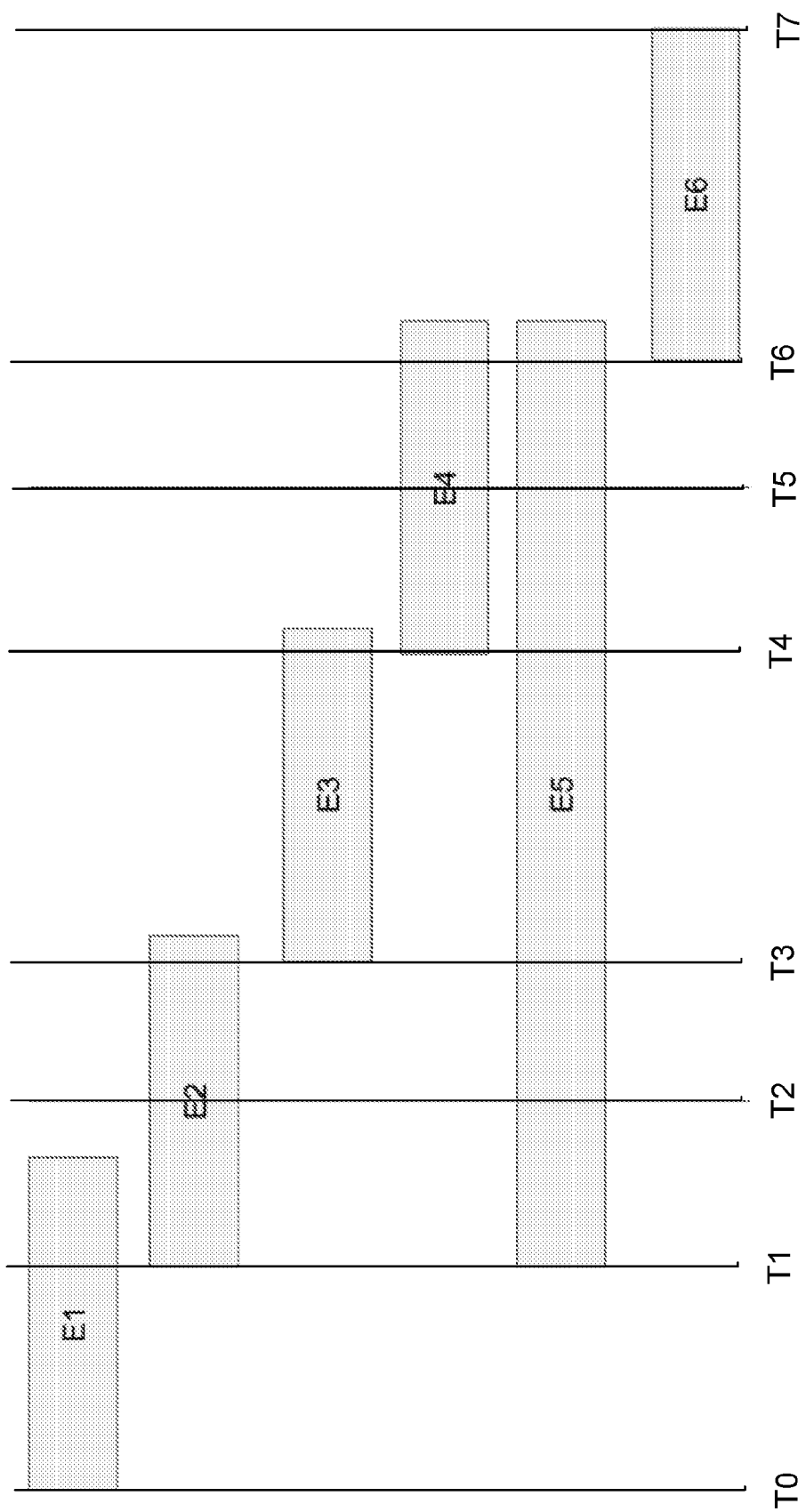
Figure 17:
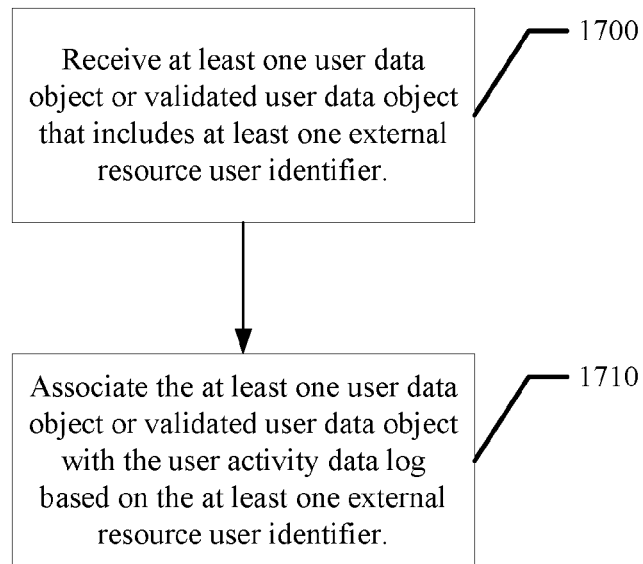
Figure 18:
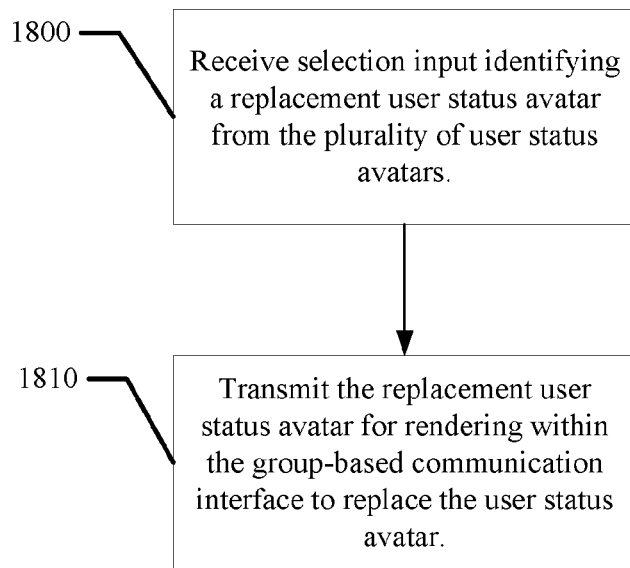
Figure 19:
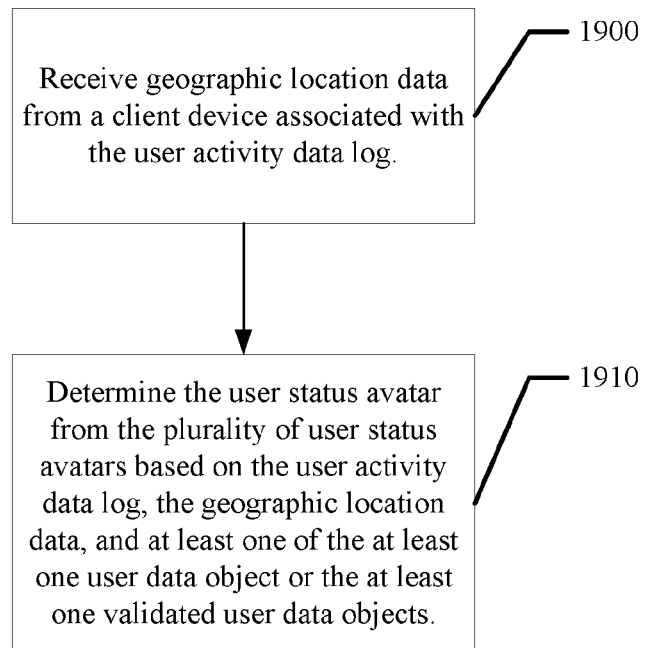
Figure 20:
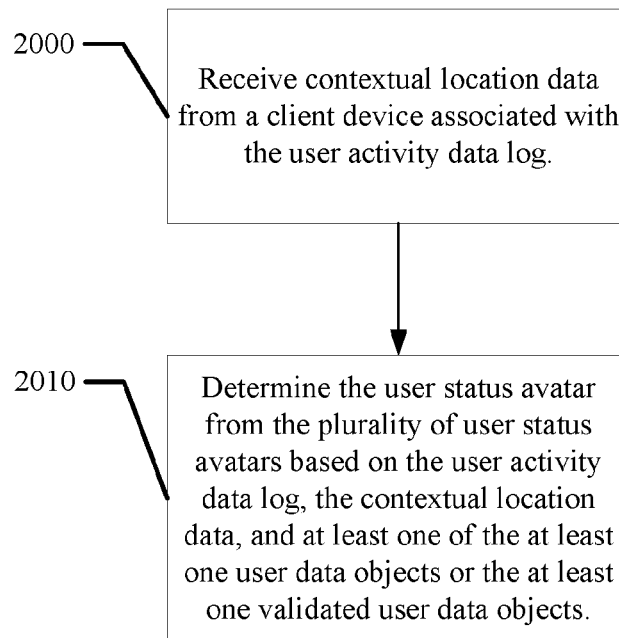
Figure 21:
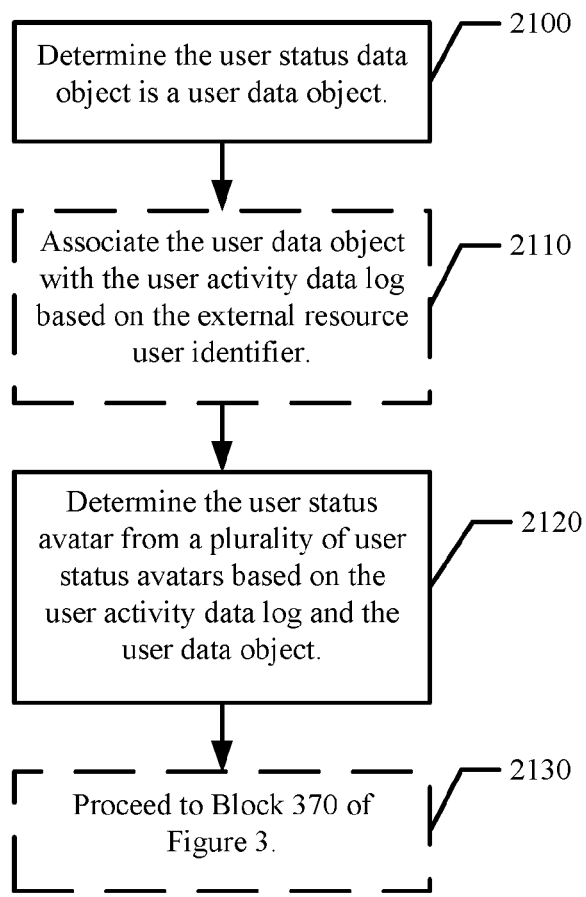
Figure 22:
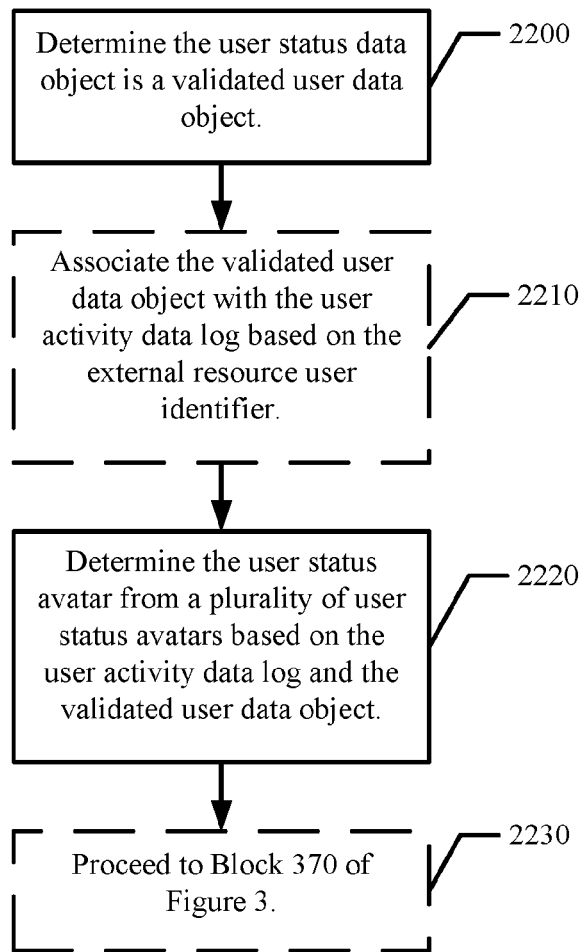

Having thus described the disclosure in general terms, reference will now be made to the accompanying drawings, which are not necessarily drawn to scale, and wherein:

FIG. 1 is a system architecture diagram of an example group-based communication system configured to practice embodiments of the present disclosure;

FIG. 2 is an example schematic diagram of a group-based communication server according to one embodiment of the present disclosure;

FIG. 3 is a flowchart illustrating operations that are executed by an example group-based communication server for determining a user status avatar from a plurality of user status avatars based on a user activity data log and a user status data object;

FIG. 4 is a flowchart illustrating operations that are executed by an example group-based communication server for determining a user status avatar from a plurality of user status avatars based on a user activity data log and at least one of at least one of the user data object or at least one of the validated data object;

FIG. 5 is a flowchart illustrating operations that are executed by an example group-based communication server for determining a replacement user status avatar;

FIG. 6 illustrates an example group-based communication interface according to one embodiment of the present disclosure illustrating an example adjustment to the avatar rendering settings;

FIG. 7 illustrates an example group-based communication interface according to one embodiment of the present disclosure illustrating a scheduled event notification rendered to a client device associated with a user;

FIG. 8 illustrates an example group-based communication interface according to one embodiment of the present disclosure illustrating an example confirmation provided by the group-based communication system in response to the example scheduled event notification shown in FIG. 7;

FIG. 9 illustrates an example group-based communication interface according to one embodiment of the present disclosure illustrating an example user status avatar configuration;

FIG. 10 illustrates an example group-based communication interface according to one embodiment of the present disclosure illustrating a popup notification of the avatar rendering settings shown in FIG. 9;

FIG. 11 illustrates an example group-based communication interface according to one embodiment of the present disclosure illustrating a user profile avatar associated with a user rendered to a group-based communication interface;

FIG. 12 illustrates an example group-based communication interface according to one embodiment of the present disclosure illustrating an example popover message of a user profile interface viewable to one or more users in a group-based communication system;

FIG. 13 illustrates an example group-based communication interface according to one embodiment of the present disclosure illustrating an example popover message of a user profile interface viewable to the user associated with the user profile;

FIG. 14 illustrates an example group-based communication interface according to one embodiment of the present disclosure illustrating an example user status avatar selection interface rendered to a client device associated with a user;

FIG. 15 illustrates an example group-based communication interface according to one embodiment of the present disclosure illustrating a user status avatar based on an interaction with a group-based communication message on the group-based communication system;

FIG. 16 illustrates an example group-based communication server conflict mapping with a plurality of user data object(s), validated user data object(s), user activity data log(s), and/or location data from a plurality of sources relating to conflicts of scheduled events;

FIG. 17 is a flowchart illustrating operations that are executed by an example group-based communication server for determining a user associated with at least one user data object or validated user data object;

FIG. 18 is a flowchart illustrating operations that are executed by an example group-based communication server for determining a replacement user status avatar based on a selection input;

FIG. 19 is a flowchart illustrating operations that are executed by an example group-based communication server for using geographic location data to determine a user status avatar;

FIG. 20 is a flowchart illustrating operations that are executed by an example group-based communication server for using contextual location data to determine a user status avatar;

FIG. 21 is a flowchart illustrating operations that are executed by an example group-based communication server for determining a user status avatar from a plurality of user status avatars based on a user activity data log and a user data object; and FIG. 22 is a flowchart illustrating operations that are executed by an example group-based communication server for determining a user status avatar from a plurality of user status avatars based on a user activity data log and a validated user data object.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the present disclosure are directed to programmatically determining a user status avatar for rendering to a group-based communication interface of a group-based communication system based on user activity data log(s) and at least one user data object(s) or validated user data object(s). The group-based communication system may include, or be in communication with, among other components, a group-based communication server, a group-based communication repository, a user identification repository, one or more external email resources, one or more validated external resources, and/or one or more client devices. Additionally, various embodiments of the present disclosure may be programmatically configured to authenticate existing user status avatars in order to verify the reliability of a user status avatar and/or determine a replacement user status avatar based on user activity data log(s), user data object(s), validated user data object(s), and/or selection input(s).

Network resources for many large commercial enterprises are unduly encumbered by delayed, flawed, duplicative, and/or inaccurate user status information. The unnecessary network demand caused by user status information is also exacerbated by the increase of interconnected devices using networks, especially in commercial enterprises that use network based solutions for a high percentage of employees to communicate. Duplicative user status information has the effect of unnecessarily increasing demand on server, as well as increasing the amount of storage required to maintain the user status information of future events without actually increasing the accuracy of users' statuses. The demand and storage issues caused by unnecessary user status information cause capacity to be used on unnecessary status information that could be used more efficiently causing servers to be overloaded or increases the cost in order to keep up with capacity demands. Inaccurate user status information may also make it difficult for servers to determine which user status information to store and/or render to a user interface and therefore may result in an overinclusion of user status information, which increases the demand on the system, or under-inclusion of user status information, which deletes accurate or timely user status information. As the amount of interconnected computing devices increase, a reduction of demand on a network caused by individual computing devices can have a large scale effect on overall demand. The accuracy of user status information can reduce the amount of demand on a network by reducing the amount of ineffective transmissions sent to and from group-based communication servers. Additionally, as more companies are adopting network based communications among all levels of operation, the need to have accurate user status information without the requirement of constant human alteration may result in a productivity boost. In addition to the network demand being unnecessarily high, these inefficiencies also affect the productivity of workers dependent upon user status information. As the amount of companies that use servers in order to communicate, the demand on a server provider increases.

Properly interpreting, combining, and providing the user status information to others in an effective manner can be difficult with current techniques. The present disclosure comprises various embodiments that are configured to solve the problem stated above. The group-based communication system of the present disclosure is configured to document the user engagement for one or more client device associated with a user in a user activity data log that is associated with the same user. The user activity data log may be transmitted or stored in a group-based communication repository that is either a part, or in communication with, the group-based communication system. The group-based communication server may be further configured to communication and receive transmission(s) from validated external resource(s) and/or external email resource(s) that comprises validated user data object(s) and/or user data object(s), respectively. Additionally, the group-based communication server may be configured to associate the received validated user data object(s) and/or user data object(s) with a user activity data log, which is associated with a user profile. The received validated user data object(s) and/or user data object(s) may include one or more external resource user identifier. The group-based communication server may be configured to include, or be in communication with, a user identification repository that stores information relating to the identification of a user profile including external resource user identifiers that are associated with a user. The group-based communication server may also be configured to determine the user status avatar for a user based on the user activity data log and at least one of at least one validated user data object or at least one user data object. The group-based communication server may also be configured to use location data received from one or more client devices to determine a user status avatar.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like. Client devices may be associated with a user. The association may be created by the client device transmitting registration information for user to the group-based communication server. In some instances, a client device may be temporarily associated with a user (e.g., only when a user is logged onto the group-based communication system app).

Client devices configured in accordance with embodiments herein described are configured to generate geographic location data and/or contextual location data. The term "geographic location data" refers to location data (e.g., latitude and longitude coordinates) that is generated by a global positioning system (GPS) receiver housed within the client device. The GPS receiver receives clock data transmitted by one or more geostationary satellites (a satellite in a known or knowable position) and/or one or more ground based transmitters (also in known or knowable positions), compares the received clock data, and computes the geographic location data, which represents a near real-time position for the client device. The term "contextual location data" refers to position or location information that is derived by the client device (or by separate server) based on interactions between the client device and local networks, objects, or devices. Example contextual location data could be derived based on reference to known locations for Wi-Fi routers or Bluetooth devices that are configured to communicate with a client device. A client device may also generate contextual location information based on communicating with radio-frequency identification (RFID) readers or tags, or barcode readers or tags, where such readers or tags have known positions.

"Group-based" is used herein to refer to a system, channel, message, or virtual environment that has security sufficient such that the system, channel, message, or virtual environment is accessible only to a defined group of users (e.g., users having a common group identifier associated with their respective user profiles). The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers and client devices, and are further configured to engage external email resources and validated external resources as defined below.

The term "group-based communication server" refers to a software platform and associated hardware that is configured to manage access to the various group-based communication interfaces (defined below) of the group-based communication system. The group-based communication server is configured to access, maintain, and support application product logic of the group-based communication system and to access one or more data repositories such as a group-based communication repository and a user identification repository.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface comprises a plurality of group-based communication channels (e.g., a marketing channel, sales channel, accounting channel, etc.), which are defined below.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like. Users referred to herein are discussed largely in connection with client device enabled activity for accessing a group-based communication interface (or set of group-based communication interfaces) of a group-based communication system.

The terms "user profile," "user account," and "user account details" refer to data, files, and other information associated with a user, including, for example, a user identifier, one or more group-based communication channel identifiers (defined below) associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, a graphical representation, an email address, a real name (e.g., John Doe), a username (e.g., jdoe), a password, a time zone, an external resource user identifier, avatar rendering settings, and the like. The user account details can include a subset designation of user credentials, such as, for example, login information for the user including the user's username and password.

The terms "group-based communication channel identifier" or "channel identifier" refer to one or more items of data by which a group-based communication channel may be uniquely identified by a group-based communication system. For example, a group-based communication channel identifier may comprise American Standard Code for Information Interchange (ASCII) text, a pointer, a memory address, and the like.

The terms "group identifier" or "team identifier" refer to one or more items of data by which a group-based communication interface within a group-based communication system may be uniquely identified. For example, a group identifier may comprise ASCII text, a pointer, a memory address, and the like. In one embodiment, the group identifier associated with member users of a Slack Corporation workspace (i.e., a group-based communication interface) is 104356721.

Group-based communication system users are organized into organization groups (e.g., employees of each company may be a separate organization group) and each organization group may have one or more group-based communication channels to which users may be assigned or which the users may join (e.g., group-based communication channels may represent departments, geographic locations such as offices, product lines, user interests, topics, issues, and/or the like). A group identifier is used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "validated external resource" refers to a software program, application, platform, or service that is configured to communicate with the group-based communication system for providing an external, non-email service (i.e., not native to the group-based communication system) to a client device via a group-based communication interface. The validated external resource operates on a compiled code base or repository that is separate and distinct from that which supports the group-based communication system. In some embodiments, the validated external resource may communicate with the group-based communication system, and vice versa, through one or more application program interfaces (APIs). In some embodiments, the validated external resource receives tokens or other authentication credentials that are used to facilitate secure communication between the validated external resource and the group-based communication system in view of group-based communication system network security layers or protocols (e.g., network firewall protocols).

The term "validated user data object" refers to structured or templatized data that is generated by and transmitted from a validated external resource to a group-based communication system. The validated user data object documents past, present, or future engagement of a user with the validated external resource and, thus, may be parsed by the group-based communication system to determine a user status at given time and an associated user status avatar. Example validated user data objects include: a user profile of the validated external resource, a user calendar object of the validated external resource, an operational workflow of the validated external resource, project management data of the validated external resource, project scheduling data of the validated external resource, client device location data captured by the validated external resource, finance management data of the validated external resource, office management data of the validated external resource, and the like.

The term "external email resource" refers to a software program, application, platform, or service that is configured to provide electronic mail ("email") services to users operating client devices. The external email resource comprises an email client, a simple mail transfer protocol ("SMTP") server, and a domain name server ("DNS"). The external email resource is configured to allow a sending user ("a sender") to create and transmit an email message to a receiving user ("a recipient"). Each email message comprises an email envelope that defines its electronic format, an email header that comprises sender/recipient information and an email subject line, and an email body that comprises text, images, and file attachments. The external email resource operates on a compiled code base or repository that is separate and distinct from that which supports the group-based communication system. Example external email resources include Microsoft Office 365@, Gmail®, and Yahoo Mail®.

An email client of the external email resource may be used by a sender to create and transmit an email message. The email message text and attachments are thus uploaded to the SMTP server as outgoing mail. A copy of the email message is stored to an email outbox associated with the sender for later retrieval. The SMTP server communicates with the DNS to find a recipient email server using recipient information drawn from the email header. Once the SMTP server finds the recipient email server, it transfers the email message to the recipient email server. The next time the recipient accesses the email client, the email client downloads the email message from the recipient email server for presentation to the recipient in an email inbox interface.

The external email resource may also include programs, applications, platforms, or services configured to provide services related to providing email services. For example, external email resources configured in accordance with embodiments herein described include calendar and scheduling services. Such calendar and scheduling services are configured to provide one or more files containing one or more user data objects to the group-based communication system. For example, the group-based communication system may subscribe to an application program interface (API) of the external email resource that is configured to transmit one or more user data objects as defined below.

The term "single-user external email corpus" refers to a file object containing all email messages and user account information that is necessary for an external email resource to reconstruct an email account (including all associated calendar and scheduling services) associated with a single user. The single-user external email corpus may include email attachments, such as calendar invitations, received and sent by a user. The single-user external email corpus may be stored in a personal storage table (".pst") format. Some or all of the single-user external email corpus, such as the calendar and scheduling services, may be stored in an iCalendar (".ics") format or a vCalendar (".vcs") format.

The term "multi-user external email corpus" refers to a file object containing all email messages and user account information that is necessary for an external email resource to reconstruct email accounts (including all associated calendar and scheduling services) associated with multiple enterprise users. For example, an enterprise administrator may use a multi-user external email corpus to rebuild email accounts for employees of ACME Corporation. The multi-user external email corpus may include email attachments, such as calendar invitations, received and sent by the multiple user. The multi-user external email corpus may be stored in .pst format. Some or all of the multi-user external email corpus, such as the calendar and scheduling services, may be stored in an iCalendar (".ics") format or a vCalendar (".vcs") format.

The term "user data object" refers to structured or templatized data that is generated by and transmitted from an external email resource to a group-based communication system. The user data object documents past, present, or future engagement of a user with the external email resource in the form of email resource engagement data. Once email resource data has been extracted, parsed, or otherwise identified from one or more user data objects, it may be used by the group-based communication system to determine a user status at given time and an associated user status avatar. Example user data objects include a user profile of the external email resource, a user calendar object of the external email resource, a single-user external email corpus of the external email resource, a multi-user external email corpus of the external email resource, or the like.

The term "external resource" refers to a software program, application, platform, or service that is configured to communicate with the group-based communication system for providing an external service (i.e., not native to the group-based communication system) to a client device via a group-based communication interface. More particularly, in some embodiments, an external resource may be either an external email resource, or a validated external email resource as described above.

The term "user status data object" refers to structured or templatized data that is generated by and transmitted from an external resource to a group-based communication system. The user status data object may be either a user data object or a validated user data object, as discussed above, based on the type of external resource. The user status data object documents past, present, or future engagement of a user with the external resource in the form of external engagement data. External engagement data may be either email resource engagement data or validated resource engagement data. Once external resource data has been extracted, parsed, or otherwise identified from one or more user status data objects, it may be used by the group-based communication system to determine a user status at given time and an associated user status avatar. The group-based communication server may be configured to process the user status data object differently based whether the user status data object is a user data object or a validated user data object.

The term "external resource user identifier" refers to one or more items of data by which a user (or user profile) of validated external resource or an external email resource may be uniquely identified by a group-based communication system. For example, an external resource user identifier may comprise American Standard Code for Information Interchange (ASCII) text, a pointer, a memory address, and the like. One or more external resource user identifiers may be stored to a user profile of a group-based communication system along with other identifiers (e.g., user identifier, group identifiers, group-based communication channel identifiers, etc.). The external resource user identifier may be embodied in a format native to the validated external resource or the external email resource to which it is associated or may be structured in a format designated by the group-based communication system. Correlating one or more external resource user identifiers to a user account or user identifier of the group-based communication system allows the group-based communication system to link accounts from disparate validated external resources or external email resources with a selected group-based communication system user account. The external resource user identifier also may include information relating to the source of the external resource (e.g., the external resource user identifier may be used to identify both the user associated with the user status data object and whether the user status data object was provided by an external email resource or a validated external resource. In some embodiments, the external resource user identifier may be defined by the external resource. The external resource user identifier may include an integer identifier, a universally unique identifier, an email address, a random string, and/or the like. In such a case, the group-based communication server may receive the external resource user identifier during the open authorization (OAuth) process.

The term "user status avatar" refers to a graphic user interface element or icon that is configured for rendering to a group-based communication interface and is intended as a visual representation of a user's status. The user status avatar may be stored and accessed by the group-based communication system in the form of an avatar file, which may include metadata including a timestamp. The user status avatar may include status text (e.g., "Out of Office"), status emojis (e.g., a palm tree to indicate that a user is on vacation), defined status period, and/or the like. User status avatars may be identified by a user status avatar identifier, which may comprise American Standard Code for Information Interchange (ASCII) text, a pointer, a memory address, and the like.

A user status avatar may be set in a group-based communication interface for a defined status period. The user status avatar and/or the defined status period may be set manually or automatically by the group-based communication system based on information provided by user activity data log(s), validated external resource(s), and/or external email resource(s).

The term "user activity data log" refers to structured or templatized data that is generated by the group-based communication system and stored to a group-based communication repository. The user activity data log documents past, present, and future engagement of the user with one or more groups, one or more channels, one or more group-based communication interfaces, and/or the group-based communication system as a whole. The user activity data log can be analyzed by the group-based communication system, along with other data sets or signals discussed herein, to determine a user status avatar from a plurality of user status avatars.

Example user activity data logs include user engagement data that tracks or embodies passive and/or active engagement by a user of one or more group-based communication interfaces of the group-based communication system. For example, the user activity data log may include: channel read data, channel write data, channel create lists, channel reaction data, direct message data, prior user status avatar data, prior defined status period data, schedule data, calendar data, out-of-office data, file access data, validated external resource access data, and the like. In some embodiments, the user activity data log embodies user engagement data collected over a selected time period (e.g., the preceding thirty days) or a user-defined schedule. In the latter example, the group-based communication system may be configured to create user activity data logs to document user engagement data only during weekdays or during work hours. Such configurations may be used to enhance privacy controls and to reduce memory or computational resource demands on the group-based communication system.

The term "group-based communication repository" refers to the location, such as a memory device, where one or more user activity data logs are stored. The group-based communication repository may be a dedicated device and/or a part of a larger repository. The group-based communication repository may be dynamically updated or be static. For example, the user activity data logs may be uploaded to the group-based communication repository simultaneously with the creation of the user activity data logs. Alternatively, the user activity data logs may not be uploaded simultaneously with their creation and instead may be batch uploaded based on other factors, such as based on time intervals (e.g., uploads occur every 15 minutes), user initiation (e.g., user may press a button to initiate the upload), or the like. The group-based communication repository may be encrypted in order to limit unauthorized access of user activity data logs and associated engagement data.

The term "user profile interface" refers to a page, pane, pop-up, modal, or other portion of a group-based communication interface that contains rendered information associated with a user profile and which accommodates user editing of such information. The user profile interface may include data drawn from a user profile, including a user's name (e.g., real name and/or username), user status avatar, position or role within a group (e.g., position in a company), group list, group-based communication channel list, and the like. The user profile interface for a selected user is configured for rendering in one or more group-based communication interfaces and is thus accessible to other members of such group-based communication interfaces. The user profile interface is configured to only allow editing by authorized users (i.e., the user associated with the user profile or some administrator).

The term "user profile avatar" refers to an indication of the user profile that is rendered to the group-based communication interface. The user profile avatar may include data drawn from a user profile, a user profile interface, or the like. The user profile avatar may be data not drawn from the user profile, but related to a user (e.g., a picture of a user may be interactive to view a user profile interface).

The term "defined status period" refers to a period of time for which a user status avatar is expected to be and/or is reliable. The defined status period may be determined before or at the time the user status avatar is initially determined. Additionally or alternatively, the defined status period may be determined or updated during after the determination of the user status avatar. The defined status period may be transmitted to the group-based communication system through a client device associated with a user or may be generated by the group-based communication system. For example, the avatar rendering settings may have a default period of time for a user status avatar to be displayed and/or the group-based communication system may determine the defined status period based on other similar activities with known defined status periods (e.g., board meetings may average two hours long).

The term "geographic location data" refers to information relating to the location of a user obtained by a global positioning system (GPS) located in the client device. A user may give permission to a client device to report the client device's GPS location to the group-based communication system. The client device, as detailed above, may be associated with a specific user profile. For example, a user may register a client device with the group-based communication system by logging onto their user profile on the group-based communication system. The geographic location data may be used to determine whether a user is present for a scheduled meeting (e.g., the GPS may indicate that a user is at a certain location that a meeting is supposed to occur).

The term "contextual location data" refers to information relating to the location of a user obtained from a local or network source such as a WiFi access point, Bluetooth communication, RFID read event, barcode scan event, or the like. The contextual location data may be provided by a client device. The information may give an indication of the location of a client device to varying degrees of certainty. A client device, either at the request of the system and/or the user, may report contextual location data to the group-based communication system. The client device may be associated with a given user. In some embodiments, the contextual location data may be provided by a device associated with a group (e.g., a company may have a RFID card reader at the doorway of a meeting room that provides contextual location data about any user that scans their card to enter the meeting room).

The term "avatar rendering settings" refers to a set of typical operations performed by the group-based communication system. One or more of the avatar rendering settings may be set by a user. One or more of the avatar rendering settings may also have a default setting when a user does not designate a specific setting (e.g., a default setting may be to render a user status avatar to all groups that a user is a member). The avatar rendering settings may include information relating to the external email resources and/or validated external resources used to determine a user status avatar, the default length of an automated user status avatar, a default replacement user status avatar when one is not determined, and the like. For example, a user may designate a selection of group-based communication channels that a user status avatar is rendered by default. For example, a user may be able to indicate which external email resource(s) and/or validated external resource(s) are used to determine a user status avatar (e.g., a user may not update the calendar data relating to one external email resource as frequently as they update the calendar data relating to another external email resource). A user may have different avatar rendering settings across different groups and/or channels. For example, the user may allow a user status avatar to be rendered to their work group and/or channel (e.g., Slack employee group), but not be rendered to other groups and/or channels. There may be predefined components of the avatar rendering settings that the user may not be capable of, or allowed by the group-based communication system, altering (e.g., the group-based communication system may also weight the sources in a certain way that cannot be changed by a user).

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example group-based communication system 105 within which embodiments of the present disclosure may operate. Users may access a group-based communication system 105 via a communication network 104 using client devices 101A-101N. The group-based communication system 105 may comprise a group-based communication server 106 in communication with at least one group-based communication repository 107. Client devices 101A-101N may interact peer-to-peer or may interact with the group-based communication server 106, group-based communication repository 107, or user identification repository 109 through the communication network 104.

Communication network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 104 may include a cellular telephone, a 902.11, 902.16, 902.20, and/or WiMax network. Further, the communication network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers as configured herein. The group-based communication server 106 may provide for receiving of electronic data from various sources, including but not necessarily limited to the client devices 101A-101N. For example, the group-based communication server 106 may be operable to receive and post or transmit user activity data logs, user data objects, validated user data objects, requests, invitations, communications, external resource user identifiers, user profiles, and the like provided by the client devices 101A-101N, the external email resources 118, and/or the validated external resources 120. The group-based communication server 106 may be configured to determine a user status avatar associated with a user. In some embodiments, the group-based communication server 106 may be in communication with the group-based communication repository 107 and/or the user identification repository 109 through the communication network 104 or otherwise. In some embodiments, the group-based communication server 106 may determine the data to be rendered to a group-based communication interface for one or more profiles associated with a user.

The group-based communication repository 107 may be embodied as a data storage device such as a Network Attached Storage (NAS) device or devices, or as a separate database server or servers. The group-based communication repository 107 comprises information accessed and stored by the group-based communication server 106 to facilitate the operations of the group-based communication system 105. For example, the group-based communication repository 107 may include, without limitation, a plurality of requests, invitations, communications, user identifiers, external resource user identifiers, and the like organized within the group-based communication repository 107. For example, a group-based communication system 105, such as the group-based communication server 106 may provide electronic data relating to a user's interactions with the system and the electronic data, also known as the user activity data log, may be stored on the group-based communication repository 107. In some embodiments, the group-based communication repository 107 may be in communication with the group-based communication server 106 through the communication network 104. In some embodiments, the group-based communication repository 107 and the group-based communication server 106 may be contained in the group-based communication system 105.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an example group-based communication system 105, requests, invitations, communications, identifiers, and the like may be sent from a client device 101A-101N to a group-based communication system 105. In various implementations, the requests, invitations, communications, user identifiers, external resource user identifiers, and the like may be sent to the group-based communication system 105 over communication network 104 directly by a client device 101A-101N, the requests, invitations, communications, identifiers, and the like may be sent to the group-based communication system 105 via an intermediary such as an intermediate server or another client device 101A-101N, and/or the like. For example, the client device 101A-101N may be a desktop, a laptop, a tablet, a smartphone, and/or the like that is executing a client application (e.g., a group-based communication app). In one implementation, the requests, invitations, communications, identifiers, and the like may include data such as a user identifier, a group identifier, a group-based communication channel identifier, an external resource user identifier, attachments (e.g., files), profile data, group-based communication interface data, email resource engagement data, validated resource engagement data, user activity data log(s), group-based communication channel data, messaging communication data, third party metadata, location data, and/or the like. Additionally, the data may be provided by the external email resource(s) 118 and/or the validated external resource(s) 120.

In an example embodiment, the group-based communication system 105 may also be connected to, or in communication with, one or more external email resources 118. The group-based communication system 105, such as the group-based communication server 106, may be in communication with the one or more external email resources 118 through the communication network 104. As discussed above, the group-based communication system 105 may be configured to receive one or more user data objects that include email resource engagement data from one or more external email resources 118.

The email resource engagement data included in the user data object that is transmitted by the external email resource(s) may include calendar data. The email resource engagement data may be received from a client device associated with a user or automatically generated by the external email resource (e.g., through information contained in an email). The user data object may also include an external resource user identifier that is associated with a user. The user identification repository 109 may provide information relating to one or more users that are associated with one or more external resource user identifier. The user data object may be a portion of a single-user or multi-user external email corpus as discussed above. The information included in the user data object may directly or indirectly indicate a user's status. For example, the user data object may include calendar data that indicates that a user has a meeting at a certain time or may indicate that a client device associated with the user has set an away message for incoming emails that indicate the user may be out of office. The user data object may transmit email resource engagement data relating to the availability of the user at one or more specific times. For example, the user data object may contain email resource engagement data about a meeting on Monday or may contain email resource engagement data about an entire month of user activities. Some user data objects may indicate recurring activities, such as weekly meetings.

In some embodiments of the present disclosure, the group-based communication system 105 may be connected to, or in communication with, at least one validated external resource 120. The group-based communication system 105, such as the group-based communication server 106, may be in communication with the at least one validated external resource 120 through the communication network 104. As discussed above, the group-based communication system 105 may be configured to receive at least one validated user data object that include validated resource engagement data from at least one validated external resource 120. The indication may also include a defined status period that a user status avatar may be rendered. For example, a human resources software, such as Workday®, may receive out of office data from a client device associated with a user that indicates a status for a certain day and the human resources software may store such data as structured out of office data in a repository. Such out of office data may then be transmitted to the group-based communication system 105 as a validated user data object. The validated user data object may also include an external resource user identifier associated with a user. The validated user data object may transmit validated resource engagement data relating to the availability of a user at one or more specific times. For example, the validated user data object may contain validated resource engagement data about a meeting on Monday or may contain validated resource engagement data about an entire month of user activities. Some validated user data objects may include information relating to recurring events, such as a typical work schedule. For example, a user may work from Wednesday through Sunday instead of a typical Monday through Friday workweek. In some embodiments, the group-based communication system 105, such as the group-based communication server 106 may only be in communication with one external email resource 118 or validated external resource 120.

In some embodiments, the group-based communication system 105 may be configured to receive an external resource user identifier from the external email resource 118 and/or the validated external resource 120. In some embodiments, the external resource user identifier may be different based on the type of external resource (i.e., external email resource or validated external resource). The external resource user identifier may include information associated with a user. The group-based communication system may determine a user profile to which the information from an external resource, such as a validated external resource or external email resource, is associated. For example, an external email resource may transmit one or more user data objects for a user and the group-based communication system 105, such as the group-based communication server 106, may determine that the one or more user data objects are associated with a user profile based on the external resource user identifier. The external resource user identifier may be provided as a user name, identification number, a real name, or the like. The external resource user identifier may be associated with the user credentials and/or user identifier discussed above. In some embodiments, the external resource user identifier may be an indication from a user that identifies information from an external resource that should be associated with that user. For example, a user may log into an external resource and give permission for the external resource to provide availability information. In some embodiments, a user identification repository 109 may transmit information relating at least one user associated with at least one external resource user identifier. The external resource user identifier may also be indicative of the type of external resource that transmitted the user status data object to the group-based communication server 106.

In some embodiments, the group-based communication system 105 may be configured to include or be in communication with a user identification repository 109. The user identification repository 109 may include identification data for one or more users. In some embodiments, the user identification repository 109 may include external resource user identifiers, user identifiers, channel identifiers, group identifiers, and the like, that are associated with one or more users. For example, the user identification repository 109 may receive user profile information from the group-based communication server 106 and also receive additional identification data, such as an external resource user identifier (e.g., the group-based communication server 106 may receive the external resource user identifier from the user). In some embodiments, the user identification repository 109 may be included in the same server as the group-based communication repository 107.

Example Group-Based Communication Server Configuration

The group-based communication system, such as the group-based communication server 106, may be embodied by one or more computing systems and include one or more components shown in apparatus shown in FIG. 2. The group-based communication server 106 may include a processor 202, a memory 201, input/output circuitry 203, user status avatar determination circuitry 206, and user profile correlation circuitry 208. The group-based communication server 106 may, in some embodiments, also include a group-based communication repository 107. In some embodiments, the group-based communication repository may be stored on the memory 201. The group-based communication server 106 may be configured to execute the operations described above with respect to FIG. 1 and below with respect to FIGS. 3-5 and 17-22. Although these components 107 and 201-208 are described with respect to functional limitations, it should be understood that the particular implementations necessarily include the use of particular hardware. It should also be understood that certain of these components 107 and 201-208 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the group-based communication server 106 may provide or supplement the functionality of particular circuitry. For example, the processor 202 may provide processing functionality, the memory 201 may provide storage functionality, the group-based communication circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, identifiers, requests, communications, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the group-based communication server 106 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The group-based communication circuitry 204 comprises hardware configured to support a group-based communication server 106. The group-based communication circuitry 204 may utilize processing circuitry, such as the processor 202, to perform these actions. The group-based communication circuitry 204 may send and/or receive data from group-based communication repository 107. In some implementations, the sent and/or received data may be of enterprise-based digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

The user status avatar determination circuitry 206 comprises hardware configured to determine the user status avatar. The user status avatar determination circuitry 206 may utilize processing circuitry, such as the processor 202, to perform these actions. The user status avatar determination circuitry 206 may send and/or receive data from group-based communication repository 107. The user status avatar determination circuitry 206 may be in communication with the group-based communication circuitry 204 to receive user data object(s) and/or validated user data object(s) that the group-based communication circuitry 204 may receive from external email resource(s) 106 and/or validated external resource(s) 108. The user status avatar determination circuitry 206 may be in communication with the user profile correlation circuitry 208 to receive correlation information relating to various user data object(s) and/or validated user data object(s). It should also be appreciated that, in some embodiments, the user status avatar determination circuitry 206 may include a separate processor, specially configured field programmable gate array (FPGA), or application specific interface circuit (ASIC).

The user profile correlation circuitry 208 comprises hardware configured to associate user activity data logs with user data object(s) and/or validated user data object(s). The user profile correlation circuitry 208 may utilize processing circuitry, such as the processor 202, to perform these actions. The user profile correlation circuitry 208 may send and/or receive data from user identification repository 109. The user profile correlation circuitry 208 may be in communication with the group-based communication circuitry 204 to receive user data object(s) and/or validated user data object(s) with corresponding external resource user identifiers. In some embodiments, the user profile correlation circuitry 208 may receive the external resource user identifier alone and not the corresponding user data object and/or validated user data object. It should also be appreciated that, in some embodiments, the user status avatar determination circuitry 206 may include a separate processor, specially configured field programmable gate array (FPGA), or application specific interface circuit (ASIC). As discussed below in reference to FIG. 3, the user profile correlation circuitry 208 may be configured differently based on whether a user status data object is a user data object or a validated user data object.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Group-Based Communication Server Operations

Referring now to FIG. 3, a flowchart is provided illustrating operations that are executed by an example embodiment of the group-based communication server for programmatically determining a user status avatar that is configured for rendering to a group-based communication interface of a group-based communication system. FIGS. 3-5 and 17-22 are for illustrative purposes and are not to be limiting unless otherwise stated herein. Unless otherwise noted, various operations discussed in FIGS. 3-5 and 17-22 may be used in the same or separate embodiments of the present disclosure.

As shown in Block 300 of FIG. 3, the group-based communication server 106 comprises means, such as the processor 202, for retrieving a user activity data log from a group-based communication repository 107, the user activity data log documenting user engagement with the group-based communication interface. The user activity data log may be associated with a user. In some embodiments, the group-based communication server 106 may transmit a request to the group-based communication repository 107 for a user activity data log for a specific user. For example, the group-based communication server 106 may transmit a user identifier to the group-based communication repository 107 with a request to return the user activity data log associated with that user identifier. In some embodiments, the group-based communication repository 107 may transmit a plurality of user activity data logs associated with one or more user and the group-based communication server 106 may determine an associated user through a user identifier and/or a user prompt (e.g., a user may be presented with a question relating to a user activity data log, such as whether they were interacting with the group-based communication system at a certain time). As discussed above, the user activity data log may document user engagement in the past, present, and/or future. In some embodiments, the user engagement data may include information relating to a user's interaction with the group-based communication system 105. For example, the user activity data log may include times and types of usage by a client device associated with a user. In some embodiments, the user activity data log may include the times for which a client device is logged into the group-based communication system 105 (e.g., the user activity data log may include that a client device associated with a user is logged into the group-based communication system 105 from 9 AM to 5 PM on Monday through Friday). In an example embodiment, the user activity data log may also include information relating to a user's interaction with specific groups and/or channels of the group-based communication system (e.g., the user activity data log may include information relating to viewed messages of a certain group by a client device associated with a user). The user activity data log may be encrypted.

As shown in Block 310 of FIG. 3, the group-based communication server 106 comprises means, such as the group-based communication circuitry 204, for receiving a user status data object from an external resource. As discussed above an external resource may be an external email resource 118 or a validated external resource 120. In some embodiments, the group-based communication server 106 may be configured to only receive a user status data object from an external email resource 118 or a validated external resource 120. Alternatively, the group-based communication server 106 may be configured to receive a user status data object from an external email resource 118 and/or a validated external resource 120. In some embodiments, the group-based communication server 106 may be configured to, such as through the avatar rendering settings, only receive user status data objects that are in a certain format. (e.g., the group-based communication server 106 may only be configured to receive user status data objects that are in .ics format). Based on the source of the user status data object, the user status data object may include a user data object (from external email resource) or a validated user data object (from a validated external resource). Additionally, the external engagement data may be either email resource engagement data or validated resource engagement based on the source of the user status data object.

Referring now to Block 330 of FIG. 3, the group-based communication server 106 comprises means, such as the processor 202, for determining a user status avatar based on the user activity data log and the user status date object. As discussed below in more detail the determination of the user status avatar may be different based on the type of user status data object received by the group-based communication server 106 in Block 310. In some embodiments, the group-based communication server 106 may be configured to only carry out one of the operations of Block 350 or Block 360. In such an embodiment, the group-based communication server 106 may be configured to skip decision Block 340 and proceed directly to the operation that the group-based communication server is configured to carry out. Alternatively, in some embodiments, the group-based communication server 106 may be configured to carry out the operations of Block 350 and Block 360. In such an embodiment, the group-based communication server 106 may include means, such as the processor 202, for carrying out the decision Block 340, discussed below. In some embodiments, the group-based communication server 106 may be configured differently in determining whether the user status data object is a user data object or a validated user data object. For example, a certain file type may always be a user data object.

Referring now to decision Block 340 of FIG. 3, the group-based communication server 106 comprises means, such as the processor 202, for determining whether the source of the user status data object is from an external email resource 118 or a validated external resource 120. In some embodiments, the transmission of the user status data object by an external resource identification information that indicates the type of source. In some embodiments, the identification of the source may be included with the external resource user identifier. For example, a portion of the external resource user identifier may be dedicated to the user and another portion may be dedicated to the type of source (e.g., an external resource user identifier may be "jdoe-E" where "jdoe" is a user's username and then the suffix "E" indicates that the external resource is an external email resource). In some embodiments, the group-based communication server 106 may be configured to only receive user status data objects from either an external email resource or a validated external resource and any user status data objects would automatically be determined to be either a user data object or validated user data object based on the configuration of the group-based communication server 106. In some embodiments, the type of file may indicate the type of source (e.g., external email may provide user data objects in a file format that the validated external resources does not provide).

Referring now to Block 350 of FIG. 3, when the user status data object is determined to be a user data object, the operations proceed to FIG. 21. Referring now to Block 2100 of FIG. 21. In some embodiments, the group-based communication server 106 comprises means, such as the processor 202, for determining that the user status data object is a user data object. For example, the group-based communication server 106 may determine that the user status data object is a user data object as discussed in Block 340 of FIG. 3 by determining the source of the user status data object. Additionally, the group-based communication server 106 may be configured in other ways to determine that the user status avatar is a user data object (e.g., the user status data object file format may indicate that the user status data object is a user data object). In some embodiments, the group-based communication server 106 may not make a determination about the type of user status data object. For example, in some embodiments, the group-based communication server 106 may be configured, either through functional limitations or through the avatar rendering settings, to only received user data object(s) or validated user data object(s). For example, the group-based communication server may only be in communication with Microsoft 365© account associated with a user and any user status data object received for the user would be a user data object.

The user data object transmitted comprises email resource engagement data. The group-based communication server 106 and the external email resource 118 may be in communication through the communication network 104. As discussed above, the user data object documents past, present, and/or future engagement of a user with an external email resource. The email resource engagement data may include calendar data relating to a user. The external email resource may transmit the user data object in an encrypted manner.

As shown in optional Block 2110 of FIG. 21, the group-based communication server 106 comprises means, such as the user profile correlation circuitry 208, for associating the user data object with the user activity data log based on the external resource user identifier. In some embodiments, the user data object may include an external resource user identifier. The group-based communication server 106 comprises means, such as the group-based communication circuitry 204, to connect to, or be in communication with, a user identification repository 109 that comprises identification data for one or more users. For example, the user identification repository 109 may store external resource user identifiers, user identifiers, channel identifiers, group identifiers, and the like, that are associated with one or more users. For example, the user identification repository 109 may receive user profile information from the group-based communication server 106 and then also subsequently receive additional identification data, such as an external resource user identifier (e.g., the group-based communication server 106 may receive the external resource user identifier from the user). In some embodiments, the external resource user identifier may be an email address associated with a user. In some embodiments, an external resource may be associated with a user and every file received from that external resource may be associated with the user. For example, an external resource may be associated by allowing the user to enter an authentication flow (e.g., OAuth) to grant access to an external resource, the result of the authentication flow may contain one or more external resource user identifiers (and corresponding access tokens) that will be associated with the user on the group-based communication server 106 and may be stored in the user identification repository 109 associate.

As shown in Block 2120 of FIG. 21, the group-based communication server 106 comprises means, such as the user status avatar determination circuitry 206, for determining the user status avatar from a plurality of user status avatars based on the user activity data log and the user data object. In some embodiments, the user status avatar may be determined from a plurality of existing user status avatars. For example, the existing user status avatar options may include "Available", "Out of Office", "Vacationing", "Out Sick", "In a Meeting", or the like. Additionally or alternatively, the user status avatar may be rendered in visual form, such as using emojis. For example, a palm tree may indicate that a user is vacationing. In some instances, a user status avatar may be unique from the existing selection of user status avatars. For example, a user may update the avatar rendering settings to render a status in support of a sports team on the day of a game. The rendered user status avatar may be time-based. For example, a user may be out of the office for a week and the user status avatar may be set to "Out of Office" for the week that the user is out of the office and then automatically return to a default user status avatar as indicated by the avatar rendering settings, such as "Available", at the conclusion of the week. In some embodiments, the existing user status avatar options may be different based on whether the user status data object is a user data object or a validated user data object. For example, there may be an existing user status avatar option for "writing an email" that would be a user status avatar option when the user status data object is a user data object and not when the user status data object is a validated user data object.

In some embodiments, the determination of a user status avatar may be based on past, present, and/or future user engagement and/or email resource engagement data gather by the user data object and the user activity data log. For example, the user activity data log may indicate that a client device associated with a user normally logs onto the group-based communication system from 9 AM to 5 PM from Monday through Friday and therefore determine that the user status avatar should be set to a default user status avatar as indicated by the avatar rendering settings, such as "Available", unless the user data object indicates otherwise (e.g., the user data object may indicate that the user has a meeting on Monday from 2 PM to 3 PM and the user status avatar should be rendered as "In a Meeting" from 2 PM to 3 PM). Once the user status avatar has been determined as discussed in relation to Block 2120 of FIG. 21, the group-based communication server 106 may be configured to proceed to Block 370 of FIG. 3 as shown in Block 2130 of FIG. 21 and discussed below in relation to Block 370 of FIG. 3.

Referring now to Block 360 of FIG. 3, when the user status data object is determined to be a validated user data object, the operations proceed to FIG. 22. Referring now to Block 2200 of FIG. 22, the user status data object is determined to be a validated user data object. In some embodiments, the group-based communication server 106 comprises means, such as the processor 202, for determining that the user status data object is a validated user data object. For example, the group-based communication server 106 may determine that the user status data object is a validated user data object as discussed in Block 340 of FIG. 3. Additionally, the group-based communication server 106 may be configured in other ways to determine that the user status avatar is a validated user data object (e.g., the user status data object file format may indicate that the user status data object is a validated user data object). In some embodiments, the group-based communication server 106 may not make a determination about the type of user status data object. In some embodiments, the group-based communication server 106 may be configured, either through functional limitations or through the avatar rendering settings, to only received user data object(s) or validated user data object(s). For example, group-based communication system may only be in communication with a Workday© account associated with a user and any user status data object received for the user would be a validated user data object.

As shown in Block 2210 of FIG. 22, the group-based communication server 106 comprises means, such as the user profile correlation circuitry 208, for associating the validated user data object with the user activity data log based on the external resource user identifier. In some embodiments, the validated user data object may include an external resource user identifier. In some embodiments, the external resource user identifier may be the same for a validated user data object as for a user data object (e.g., a username associated with the user may be included with both a user data object and a validated user data object). Alternatively, the external resource user identifier may be different for user data objects and validated user data objects. In some embodiments, there may be a plurality of external resource user identifier for different validated user data object(s) and/or user data object(s). The external resource user identifier may also be based on the format of the user status data object. For example, the external resource user identifier may be different for various file types.

The group-based communication server 106 comprises means, such as the group-based communication circuitry 204, to connect to, or be in communication with, a user identification repository 109 that comprises identification data for one or more users. For example, the user identification repository 109 may store external resource user identifiers, user identifiers, channel identifiers, group identifiers, and the like, that are associated with one or more users. For example, the user identification repository 109 may receive user profile information from the group-based communication server 106 and then also subsequently receive additional identification data, such as an external resource user identifier (e.g., the group-based communication server 106 may receive the external resource user identifier from the user).

As shown in Block 2220 of FIG. 22, the group-based communication server 106, comprises means, such as the user status avatar determination circuitry 206, for determining the user status avatar from a plurality of user status avatars based on the user activity data log and the validated user data object. In some embodiments, the user status avatar may be determined from a plurality of existing user status avatars. For example, the existing user status avatar options may include "Available", "Out of Office", "Vacationing", "Out Sick", "In a Meeting", or the like. Additionally or alternatively, the user status avatar may be rendered in visual form, such as using emojis. For example, a palm tree may indicate that a user is vacationing. In some instances, a user status avatar may be unique from the existing selection of user status avatars. For example, a user may update the avatar rendering settings to render a status in support of a sports team on the day of a game. The rendered user status avatar may be time-based. For example, a user may be out of the office for a week and the user status avatar may be set to "Out of Office" for the week that the user is out of the office and then automatically return to a default user status avatar as indicated by the avatar rendering settings, such as "Available", at the conclusion of the week. As discussed above, in some embodiments, the existing user status avatar options may be different based on whether the user status data object is a user data object or a validated user data object.

In some embodiments, the determination of a user status avatar may be based on past, present, and/or future user engagement and/or validated resource engagement data gather by the validated user data object and the user activity data log. For example, the user activity data log may indicate that a client device associated with a user normally logs onto the group-based communication system from 9 AM to 5 PM from Monday through Friday and therefore determine that the user status avatar should be set to a default user status avatar as indicated by the avatar rendering settings, such as "Available", except for when the validated user data object indicates otherwise (e.g., the validated user data object may indicate that the user is taking a vacation day). Once the user status avatar has been determined as discussed in relation to Block 2220 of FIG. 22, the group-based communication server 106 may be configured to proceed to Block 370 of FIG. 3 as shown in Block 2230 of FIG. 22 and discussed below in relation to Block 370.

In some embodiments, the group-based communication server 106, regardless of the user status data object(s) received, may be configured to receive a selection input from a client device associated with a user that indicates a custom user status avatar for the user. In such an embodiment, the group-based communication server 106 may be configured to not alter the user status avatar until the defined status period, if one is set, expires or the user indicates that the user status avatar is no longer relevant. In some embodiments, the group-based communication server 106 may be configured to prioritize certain types of scheduled events over others. For example, the group-based communication server 106 may prioritize an out of office status over one for a meeting.

As shown in optional Block 370 of FIG. 3, the group-based communication server 106 comprises means, such as the processor 202, for rendering the user status avatar to a user profile interface of the group-based communication interface that is associated with the user activity data log. In some embodiments, the avatar rendering settings may indicate to which groups and/or channels of the group-based communication system a certain user status avatar should be rendered. In some embodiments, a user may have multiple user status avatars across different groups and/or channels that the user is a member. For example, in some groups and/or channels, such as a work group (e.g., Slack employee group), the user's work schedule may be used to determine the user status avatar for those groups, while in other groups, such as a group with non-work friends, there may be other factors used to determine a user status avatar and therefore a user may have one user status avatar for work groups and a second user status avatar for other groups (e.g., when a user is on vacation, the work groups may indicate vacation, while the user's other groups may indicate that the user is available, since the user is not at work). Additionally, in some embodiments, the user status avatar for a user may be rendered to one or more groups and/or channels, while no user status avatar is provided to other groups and/or channels that the user is a member (e.g., a user status avatar may render as "Unknown" to the groups and/or channels for which the user status avatar is not viewable).

Referring now to FIG. 4, a flowchart is provided illustrating operations that are executed by an example embodiment of the group-based communication server for programmatically determining a user status avatar that is configured for rendering to a group-based communication interface of a group-based communication system. Some of the operations of FIG. 4 are similar to, or the same as, the operations of FIG. 3. Unless otherwise noted, the operations discussed in FIG. 3 may also be used in connection with the operations of FIG. 4. As previously stated above, the operations discussed herein are illustrative and should not be construed as limiting.

As shown in Block 400 of FIG. 4, the group-based communication server 106 comprises means, such as the processor 202, for retrieving a user activity data log from a group-based communication repository, the user activity data log documenting user engagement with the group-based communication interface. The retrieval of a user activity data log in Block 400 of FIG. 4 may be substantially the same to the retrieval of a user activity data log discussed in Block 300 of FIG. 3.

As shown in optional Block 410 of FIG. 4, the group-based communication server 106 comprises means, such as the group-based communication circuitry 204, for receiving at least one user data object from at least one external email resources, the at least one user data object comprising email resource engagement data. User data objects are discussed in more detail above in the definition section and in reference to FIG. 21 and Block 350 of FIG. 3. In some embodiments, the group-based communication server 106 may receive multiple user data objects associated with the same user. In some embodiments, the multiple user data objects may be received from one external email resource. Alternatively, the multiple user data objects may be received from multiple external email resources. In some embodiments, a client device associated with a user may transmit an indication to the group-based communication server 106 on which external email resources may include information relating to the user. For example, a client device associated with the user may transmit an indication to the group-based communication server 106 of an account associated with one or more specific external email resources (e.g., a client device associated with a user may indicate that the user has a Google account with the user name user@gmail.com). The user data objects may pertain to the email resource engagement data for overlapping and/or distinct periods of time. For example, a user data object from a first external email resource may contain email resource engagement data relating to the weekdays, a second external email resource may have email resource engagement data relating to the weekend, and a third external email resource may have email engagement data relating to both weekdays and weekends. As discussed above, in some embodiments, the group-based communication server 106 may be in communication with the external email resource through the communication network 104. In some embodiments, the group-based communication server 106 comprises means, such as the processor 202, for registering interest with the external email resource, such as via a HTTPS representational state transfer (REST) API. Additionally, the external email resource may be configured to transmit data to the group-based communication server 106 via a HTTP callback (e.g., webhook). In some embodiment the group-based communication server 106 may request user data object(s) from the external email resource(s) at regular intervals (e.g., every 5 to 15 minutes).

As shown in Block 420 of FIG. 4, the group-based communication server 106 comprises means, such as the group-based communication circuitry 204, for receiving at least one validated user data object from at least one validated external resource, the at least one validated user data object comprising validated resource engagement data. The group-based communication circuitry 204 and the validated external resource(s) may be in communication with one another through the communication network 104. In some embodiments, the group-based communication server 106 comprises means, such as the processor 202, for registering interest with the validated external resource, such as via a HTTPS REST API. Additionally, the validated external resource may be configured to transmit data to the group-based communication server 106 via a HTTP callback (e.g., webhook). In some embodiment the group-based communication server 106 may request validated user data object(s) from the validated external resource(s) at regular intervals (e.g., every 5 to 15 minutes). As discussed above, the validated user data object documents past, present, and/or future engagement of a user with a validated external resource. The validated resource engagement data may include calendar data relating to a user. The validated external resource(s) may transmit the validated user data object(s) in an encrypted manner.

As shown in optional Block 430 of FIG. 4, the group-based communication server 106 comprises means, such as the processor 202, for associating the at least one user data object and/or the at least one validated data object with the user activity data log based on one or more external resource user identifiers. Unless otherwise noted, the associating of Block 430 for the user data object(s) from the external email resource may use the same operations as the correlation done in reference to FIG. 21 (user data objects) and/or FIG. 22 (validated user data objects). In some embodiments, the validated data object(s) from the validated external resource may be associated in a similar fashion as the user data object above. For example, the validated external resource may provide an external resource user identifier indicating the user associated with the validated data object(s) transmitted. Alternatively, the correlation may be different between user data object(s) and validated user data object(s). For example, in some embodiments, the external user identifier for one validated user data object associated with a user may be distinct from the external user identifier for another validated user data object associated with a user and/or user data object associated with a user. Additionally, the external user identifier for one user data object may be distinct from the external user identifier for another validated user data object associated with a user and/or user data object associated with the user.

As discussed above in reference to correlation process of FIG. 21 (user data objects) and/or FIG. 22 (validated user data objects), in some embodiments, the group-based communication server 106 comprises means, such as the group-based communication circuitry 204, to be connected to, or be in communication with, a user identification repository 109 that comprises identification data for one or more users. In some embodiments, the user identification repository 109 may include external resource user identifiers, user identifiers, channel identifiers, group identifiers, and the like, that are associated with one or more users. For example, the user identification repository 109 may receive user profile information from the group-based communication server 106 and also receive additional identification data associated with the user profile information, such as an external resource user identifier (e.g., the group-based communication server 106 may receive the external resource user identifier from the user through the input/output circuitry 203). In some embodiments, the user identification repository 109 may be stored in the memory 201 of the group-based communication server 106. In some embodiments, the user identification repository 109 may be located remote from the group-based communication server 106.

As shown in Block 440 of FIG. 4, the group-based communication server 106 comprises means, such as the user status avatar determination circuitry 206, for determining the user status avatar from a plurality of user status avatars based on the user activity data log and at least one of the at least one validated user data objects or the at least one user data objects. In some embodiments, the group-based communication server 106 comprises means, such as the user status avatar determination circuitry 206, for basing the determination of the user status avatar for a user on every user activity data log, validated user data object, and user data object received that is associated with a user. In some embodiments, as discussed in more detail below in reference to FIG. 5, there may be a plurality of user activity data logs associated with a user. Alternatively, the group-based communication server 106 comprises means, such as the user status avatar determination circuitry 206, for basing the determination of the user status avatar on the user activity data log(s) associated with a user and at least one, but not all, of the user data object(s) and/or validated user data object(s).

In some embodiments, the group-based communication server 106 may place a greater weight on one or more of the user activity data log(s), validated user data object(s), or user data object(s) than another. For example, a user activity data log with high reliability may get preferential treatment in the determination of a user status avatar over a user data object from an external email resource with unknown reliability. In some instances, an example embodiment of the group-based communication server 106 may receive a plurality of user activity data log(s), validated user data object(s), or user data object(s), but not all of the plurality have user status information relevant for a given time and therefore the group-based communication server 106 comprises means, such as the user status avatar determination circuitry 206, for only using the engagement data from the plurality of user activity data log(s), validated user data object(s), and/or user data object(s) that has information relevant to a certain time for which a user status avatar is being determined. For example, a user data object associated with a user may include information about the user's status during weekdays only and not on weekends. In some embodiments, the user activity data log(s), validated user data object(s), and/or user data object(s) may be designated to provide user status information for certain times (e.g., a user data object provided from an external email resource associated with the user's work may only provide user status information during working hours). In some embodiments, one or more of the external email resource(s) and/or validated external resource may be designated as a primary external resource and the group-based communication server 106 may place more, or all, of the weight in determining a user status avatar on the user status data object(s) received from the primary external resource(s) over other user status data object(s). The configuration of the prioritization of multiple external resources may be determined by a system administrator or the user. For example, validated user data objects from the Workday© resource may always be preferred over any other user status data object.

As discussed in more detail in reference to FIGS. 19 and 20 below, in some embodiments, the location information, geographic (e.g., GPS data) and/or contextual (e.g., wireless connections), of a client device associated with a user may be used to determine the user status avatar. In some embodiments, the location information may be used when the user engagement data, the email resource engagement data, and/or the validated resource engagement data provide contradictory and/or inconclusive data relating to a user's status for a given time. For example, the location of a client device associated with a user may indicate that a user is in the office, which allows the group-based communication server 106 to verify that a user is present for a meeting from 2 PM to 3 PM as indicated by a user data object despite the user activity data log indicating that the user has not logged onto the group-based communication system during that time. In such embodiments, a client device associated with the user may indicate, such as through the avatar rendering settings, to the group-based communication server whether any location-based data, either contextual or geographic, may be used in the determination of a user status avatar for the user. (e.g., the user may have to give permission for location data to be used by the group-based communication server 106).

As shown in optional Block 450 of FIG. 4, the group-based communication server 106 comprises means, such as the processor 202, for rendering the user status avatar to a user profile interface of the group-based communication interface that is associated with the user activity data log. The rendering of the user status avatar of Block 450 of FIG. 4 may be substantially the same to the rendering of the user status avatar discussed in Block 370 of FIG. 3.

Referring now to FIG. 5, a flowchart is provided illustrating operations that are executed by an example embodiment of the group-based communication server configured to replace a user status avatar being rendered on a group-based communication interface of a group-based communication system. In the operations of FIG. 5, one or more of Blocks 500, 510, or 520 may occur before the operations of Block 530 are carried out. The user activity data log(s), user data object(s), and/or validated user data object(s) received or retrieved by the group-based communication server 106 during the operations of one or more of Blocks 500-520 may be known collectively referred to as a replacement data object. In some embodiments, the operations of the flowchart in FIG. 5 may occur after a user status avatar has been rendered for a defined status period and in some embodiments the operations of the flowchart in FIG. 5 may occur at other times not related to any defined status period (e.g., a user status avatar may be updated even though the current user status avatar does not have an expiration or the expiration has not yet occurred).

As shown in optional Block 500 of FIG. 5, the group-based communication server 106 comprises means, such as the processor 202, for retrieving a second user activity data log from the group-based communication repository 107, the second user activity data log documenting a second user engagement with the group-based communication interface. The second user activity data log may be retrieved in similar way that the first user activity data log is retrieved, as discussed in reference to Block 300 of FIG. 3 and/or Block 400 of FIG. 4. In some embodiments, the second user activity data log may indicate a user's status for a different time than the first user activity data log. For example, the second user activity data log may relate to the user engagement of a client device associated with a user for the weekend, while the first user activity data log may relate to the user engagement of a client device associated with the user during the week. In some embodiments, the second user activity data log may document user engagement of different group(s) and/or channel(s) within the group-based communication system. For example, the first user activity data log may document user engagement of a client device associated with a user in a work group, while the second user activity data log may document user engagement of a client device associate with the user in a non-work group. In some embodiments, the second user activity data log may relate to the same time, group, and/or channel as the first user activity data log. For example, the second user activity data log may be an updated version of the first user activity data log. In some embodiments, the second user activity data log may be used by the group-based communication server 106, such as by the processor 202, to verify user engagement data from the first user activity data log. For example, a second user activity data log may verify that the user engagement data of the first user activity data log was correct. In some embodiments, there may be additional user activity data log(s) associated with the user (e.g., third user activity data log, fourth user activity data log, fifth user activity data log, etc.) in addition to the second user activity data log that may be used by the group-based communication server 106 in a similar fashion to the first and second user activity data log.

As shown in optional Block 510 of FIG. 5, the group-based communication server 106 comprises means, such as the group-based communication circuitry 204, for receiving at least one additional user data object from at least one external email resource 118. In some embodiments, the group-based communication server 106 may receive a plurality of user data objects from the same external email resource. For example, an external email resource (e.g., Google Calendar) may provide a first user data object for a first period of time and then an additional user data object for a second period of time. Additionally or alternatively, the group-based communication server 106 may receive a plurality of user data objects from a plurality of external email resources. For example, a first external email resource (e.g., Google) may transmit a user data object to the group-based communication server 106 and then a second external email resource (e.g., Office365) may transmit an additional user data object to the group-based communication server. In some embodiments, the at least one additional user data object may relate to the same or overlapping period of time as the first user data object. For example, the at least one additional user data object may be an updated version of the first user data object (e.g., the first user data object may have calendar data relating to the month of March that is accurate as of a first time and at least one additional user data object may have calendar data relating to the same month of March that is accurate as of a second time after the first time). In some embodiments, the at least one additional user data object may be used by the group-based communication server 106, such as by the processor 202, to verify other user data objects, including the first user data objects and other user data objects. For example, at least one additional user data object may verify that the email resource engagement data of the first user data object was correct. In some embodiments, the at least one additional user data object may be in the same format as the first user data object.

As shown in optional Block 520 of FIG. 5, the group-based communication server 106 comprises means, such as the group-based communication circuitry 204, for receiving at least one additional validated user data object from at least one validated external resource. In some embodiments, the group-based communication server 106 may receive a plurality of validated user data objects from the same validated external resource. For example, a validated external resource (e.g., Workday) may provide a first validated user data object for a first period of time and then an additional validated user data object for a second period of time. Additionally or alternatively, the group-based communication server 106 may receive a plurality of validated user data objects from a plurality of validated external resources. For example, a first validated external resource (e.g., a human resource tracking software) may transmit a validated user data object to the group-based communication server 106 and a second validated external resource (e.g., a workflow management software) may transmit an additional validated user data object to the group-based communication server. In some embodiments, the at least one additional validated user data object may relate to the same or overlapping period of time as the first validated user data object. For example, the at least one additional validated user data object may be an updated version of the first validated user data object (e.g., the first validated user data object may have calendar data relating to a certain day of the week that is accurate as of a first time and at least one additional validated user data object may have calendar data relating to the same day of the week that is accurate as of a second time after the first time). In some embodiments, the at least one additional validated user data object may be used by the group-based communication server 106, such as by the processor 202, to verify other validated user data objects, including the first validated user data objects and other validated user data objects. For example, at least one additional validated user data object may verify that the external resource engagement data of the first validated user data object was correct. In some embodiments, the at least one additional validated user data object may be in the same format as the first validated user data object.

As shown in Block 530 of FIG. 5, the group-based communication server 106 comprises means, such as the user status avatar determination circuitry 206, for determining a replacement user status avatar from the plurality of user status avatars. In some embodiments, the user may receive a replacement data object 550, which comprises at least one of the second user activity data log (e.g., Block 500 of FIG. 5), at least one additional user data object (e.g., Block 510 of FIG. 5), and/or at least one additional validated user data object (e.g., Block 520 of FIG. 5). In some embodiments, the determination of a replacement user status avatar may be similar to the original determination of the user status avatar, discussed in relation to Block 330 of FIG. 3 and Block 440 of FIG. 4 and therefore unless otherwise noted the operations discussed in relation to those blocks also may apply to Block 530 of FIG. 5. In an example embodiment, the group-based communication server comprises means, such as the user status avatar determination circuitry 206, for using the current user status avatar to determine a replacement user status avatar. For example, the group-based communication server 106 may be configured to, such as through the avatar rendering settings, default to keeping the current user status avatar active when the replacement data object 550 does not indicate a user status avatar for a given time. In some embodiments, the group-based communication server 106 comprises means, such as the processor 202, for validating the user status avatar based on the replacement data object 550. In some embodiments, the validation of the user status avatar may occur at the time, or close in proximity to the time, that the replacement data object 550 is received by the group-based communication server 106. Additionally or alternatively, a validation of the user status avatar may occur periodically independent of the time that a replacement data object is received (e.g., a group-based communication server 106 may verify a user status avatar once daily).

In some embodiments, the replacement user status avatar may be determined regardless of the existing user status avatar. For example, the existing user status avatar may have already expired and/or had not provided any information relating to the user's current status. In such embodiments, the group-based communication server 106 comprises means, such as the user status avatar determination circuitry 206, for determining the replacement user status avatar based on at least a portion of the replacement data object. The determination of the replacement user status avatar may be similar to the determination of the existing user status avatar. In some embodiments, multiple replacement user status avatars may be determined (e.g., there may be a second replacement user status avatar that replaces a first replacement user status avatar).

As shown in optional Block 540 of FIG. 5, the group-based communication server 106 comprises means, such as the processor 202, for rendering the replacement user status avatar to the group-based communication interface to replace the user status avatar. Unless otherwise noted, the rendering of the replacement user status avatar may be similar to or the same as the rendering of the user status avatar discussed in reference to Block 370 of FIG. 3 and Block 450 of FIG. 4. In some embodiments, the replacement user status avatar may replace an existing user status avatar for all of the groups and/or channels for which the existing user status avatar may be rendered. Alternatively, the replacement user status avatar may only be rendered to some of the groups and/or channels that the existing user status avatar is rendered. In such an embodiment, the existing user status avatar may remain for the groups and/or channels that the replacement user status avatar is not rendered and/or the user status avatar of such groups and/or channels may be changed to a default user status avatar that may be determined by the avatar rendering settings. For example, the avatar rendering settings may indicate that a specific user status avatar be rendered or that no user status avatar be rendered.

In some embodiments, the additional information received, such as the additional user status object(s) and/or user activity data log(s) discussed in reference to Blocks 500, 510, and/or 520, may indicate that a scheduled event has ended before the defined status period or has extended beyond the defined status period. For example, a user status avatar may be set to "In a meeting" from 2 PM to 3 PM based on a scheduled phone call with the one or more others. In such an example, the group-based communication server 106 may receive an indication from a validated external resource (e.g., the phone) that the user is still on the call after 3 PM and the user status avatar remains "In a meeting" until the user is no longer on the call (e.g., the user's presence on a call may be indicated by a particular user identifier relating to the user being active on the phone call). In some embodiments, the validated external resource that provides the call status of a user may be a primary external resource for the propose of prioritizing one user status data object over another as described herein. In some embodiments, the group-based communication server 106 may include means, such as the processor 202, for receiving an input from a client device associated with the user indicating that a defined status period should be extended or shortened.

Example Group-Based Communication Interfaces

FIGS. 6-15 are illustrative of the present disclosure and are not in any way limiting unless otherwise noted. Referring now to FIG. 6, an example group-based communication interface is provided illustrating the avatar rendering settings being rendered to a client device for adjustment. As shown, the user profile of the group-based communication system 105 is connected to the user's company email calendar 610 and product team calendar 620. Additionally, the group-based communication interface may receive user inputs indicating additional calendars to import. For example, a group-based communication interface may allow the user to select other calendars to add (e.g., adding a Google Calendar 630). In an example embodiment, the group-based communication server 106 comprises means, such as the input/output circuitry 203, to receive selection input(s) from a client device associated with the user relating to the avatar rendering settings for one or more connected calendars. For example, the group-based communication server 106, such as the input/output circuitry 203, may receive selection inputs relating to whether one or more calendars should be used to automatically determine the user status avatar. In some instances, a group-based communication server 106 may receive an indication from a client device associated with the user that a calendar should not be used to determine the user status avatar (e.g., the user may not keep certain calendars up to date). The avatar rendering settings may be any configuration that dictates the way in which the group-based communication server 106 determines a user status avatar. In some embodiments, the avatar rendering settings also comprises one or more indications of the groups and/or channels a specific user status avatar will be rendered. The avatar rendering settings may include the external email resources and/or validated external resources used to determine a user status avatar, the default length of an automated user status avatar, a default replacement user status avatar when one is not determined, and the like, In some embodiments, the avatar rendering settings may be preselected "default" selections and/or user-inputted selections. For example, the avatar rendering settings default may be to display a user status avatar to every group and/or channel for which the user is a member and a client device associated with the user may transmit an indication to change this to only display a user status avatar to some of the groups and/or channels for which the user is a member.

Referring now to FIG. 7, an example group-based communication interface is provided rendering a scheduled event notification. In such an example, the group-based communication server 106 comprises means, such as the processor 202, to render a scheduled event confirmation as shown based on the user activity data log, a user data object, and/or a validated user data object. For example, as shown, an external email resource (e.g., Google) may provide a user data object that contains email resource engagement data relating to a meeting "Today" from 1:30 PM to 2:00 PM (e.g., as shown at 720 of FIG. 7). In such an example, the calendar data determined from the email resource engagement data may be rendered to a client device associated with the user (e.g., as seen in FIG. 7). In some cases, the user may, via the client device associated with the user, confirm a scheduled event and that indicate whether the calendar data affects the user status avatar associated with the user. In some embodiments, the scheduled event information 720 may be rendered on the group-based communication interface and also allow an input 740 from the client device indicating that the scheduled event should be used in the determination of the user status avatar. For example, the client device associated with the user may indicate that the user status avatar may be set to "In a Meeting" unless other user activity data log(s), user data object(s), or validated user data object(s) indicate otherwise. Additionally, as shown in FIG. 7, the scheduled event may indicate a defined status period (e.g., from 1:30 PM to 2:00 PM as shown at 720).

After receiving the input from the client device associated with the user, a confirmation of the automation of the user status avatar may be rendered, as shown in FIG. 8. In some embodiments, the group-based communication server 106 may not request a confirmation from the client device and instead display a confirmation of the scheduled event, such as the one shown in FIG. 8. Additionally, in some embodiments, the avatar rendering settings may be configured, such as by one or more inputs into a client device, to not display individual scheduled events and/or confirmation to the group-based communication interface. In some embodiments, the rendering of the individual scheduled events and/or confirmation to the group-based communication interface may be for a set amount of time, such as a trial period for the group-based communication server 106 to determine the accuracy of a determined event. For example, a confirmation may be displayed to a client device associated with the user for a set amount of days and/or scheduled events when an external resource is first registered with the group-based communication server 106.

Referring now to FIG. 9, an example group-based communication interface is provided illustrating the potential external email resource(s) and/or validated external resource(s) that may be configured to determine and/or update the user status avatar for a user. As shown, the client device associated with the user may transmit a selection of the external resources, external email resource(s) and/or validated external resource(s), to which the group-based communication server 106 considers in determining the user status avatar. As shown in FIG. 9, there are two external email resources (e.g., Google Calendar App 940 and Microsoft Outlook App 950) and one validated external resource (e.g., Workday App 960) that are associated with the user registered with the group-based communication server 106. In some embodiments, such as the one shown in FIG. 9, the client device associated with a user may transmit a preference for the external resources used to determine the user status avatar. For example, in this case, the user has selected the Google Calendar App 940 and the Workday App 960 accounts associated with the user to be used to determine the user status avatar, while selecting that the Microsoft Outlook App 950 account associated with the user not be used to determine the user status avatar. In some embodiments, the client device associated with a user may transmit a selection of different external resources to be used for determining the user status avatar of different groups and/or channels for which they are members. For example, the Microsoft Outlook App 950 account associated with the user may include information relating to non-work hours and may not be effectively used to determine the user status avatar of a work group and/or channel. In such a case, the client device associated with the user may transmit an indication through the avatar rendering settings to use the Microsoft Outlook App 950 account to determine the user status avatar for non-work groups. As shown in FIG. 9, the avatar rendering settings may also allow a custom user status avatar to be inputted 910 and also allow for a selection input of one of a plurality of preconfigured user status avatars 920. In some embodiments, the preconfigured, or existing, user status avatars may be determined by the group-based communication server or by an external resource. For example, an external email resource may have a set of preconfigured statuses that the group-based communication server 106 may use to determine the user status avatar (e.g., a group-based communication server 106 may receive a transmission that indicates that a user is out of office and therefore may determine that the user status avatar for the user should be "Out of Office").

Referring now to FIG. 10, an example group-based communication interface is provided showing a popup notification 1020 of the avatar rendering settings, such as the avatar rendering settings of FIG. 9, illustrating the external email resource(s) and/or validated external resource(s) used to determine the user status avatar. In some embodiments, a confirmation is provided when the avatar rendering settings are updated and/or a user status avatar is altered. For example, as shown in FIG. 10, a client device associated with the user renders a popup notification 1020 indicating that there are two "Apps" (i.e., external email resource(s) and/or validated external resource(s)) being used to determine the user status avatar. In this example, the notification is an extension of the selections made in FIG. 9, where the client device associated with the user transmitted the selection that one external email resource (i.e., Google Calendar 940) and one validated external resource (i.e., Workday 960)

be used to determine the user status avatar, while not selecting a second external email resource (i.e., Microsoft Outlook 950) should not be used. In some embodiments, the group-based communication server 106 may also consider one or more user activity data logs in determining a user status avatar. In such embodiments, the user activity data log used to determine the user status avatar may be, but not necessarily has to be, rendered in a confirmation with the external email resource(s) and/or validated external resource(s) used to determine the user status avatar. In some embodiments, the notification may be rendered to the group-based communication interface in a different way, such as a push notification to a client device.

Referring now to FIG. 11, a user profile interface may be viewable by one or more users of the group-based communication interface. In some embodiments, the group-based communication server 106 may be configured to receive a transmission from a client device associated with a user that indicates the additional users that are able to view the user profile interface associated with the user and the amount of the user profile rendered to the user profile interface. In various embodiments, the additional users may be determined based on membership in a common group and/or channel with the user. In some embodiments, the group-based communication server 106 may receive an indication from a client device associated with the user creating or updating the avatar rendering settings. For example, the avatar rendering settings may indicate which users should be able to view the user profile interface (e.g., the user profile interface may be viewable to a limited number of group(s) and/or channel(s)). In some embodiments, the avatar rendering settings may also include the content of the user profile that is viewable on the user profile interface to additional users. In various embodiments, the avatar rendering settings may indicate which components of a user profile are viewable. The components of the user profile that are viewable may include username 1105, picture 1110, real name 1120, job title 1130, location, user status avatar 1140, group-based communication system engagement, and/or the like. In some embodiments, a user may have different avatar rendering settings for different groups and/or channels for which the user is a member (e.g., a user may not want to display their job title in a non-work group). Additionally, in some embodiments, the user profile interface may provide an option for the users viewing the user profile interface to view the specific user's user profile interface 1150. In such a case, the avatar rendering settings may indicate which components may be shown on the user profile interface, which components may be shown when a user views the user's profile, and which components are not shown to anyone, other than the user associated with the user profile. In some embodiments, there may be default avatar rendering settings relating to which components of a user profile are viewable by other users as a user profile interface. For example, the default avatar rendering settings for the user profile interface may be for all of the user profile to be viewable as the user profile interface, but may restrict user without any connection with the user (e.g., guests who are not members of any groups and/or channels with a user may not be able to view the user profile interface for the user). In some embodiments, the group-based communication server 106 may receive a input from a client device associated with the user indicating a privacy level, including, such as, the amount of user profile to be displayed to a user profile interface; individual users, groups, and/or channels that may view the user profile interface; and/or the like.

Referring now to FIG. 12, a popover of a user profile interfaces associated with a user viewable when the user posts a group-based communication message on the group-based communication system. In some embodiments, the popover of the user profile interface may be displayed near the user's message over various different group-based communication interfaces (e.g., person to person private messages, messages to channels and/or groups, etc.). For example, as shown in FIG. 12, a user profile avatar 1230 may be shown, such as an emoji, next to user's name that indicates the user status avatar for the user. In some embodiments, the user profile avatar 1230 may include the entire user status avatar next to the user's name information. For example, the entire user status avatar may be an emoji. As shown in FIG. 12, in some embodiments, the user profile avatar may be an indicator for a user and is independent of the user status avatar. In some embodiments, a user may be able to view additional information relating to the user status avatar by hovering over, clicking on, or otherwise interacting with the user profile avatar 1230. For example, as shown in popover 1220 of FIG. 12, the additional information relating to the user status avatar may include the user status avatar (e.g., "In a meeting") with an identification avatar component associated with one or more of the user activity data log(s), external email resource(s), and/or validated external resource(s) used to determine the user status avatar (e.g., "O365 Calendar App"), the defined status period of the user status avatar (e.g., "Until 1 pm"), and/or the like.

Referring now to FIG. 13, a user profile interface is provided that may be only viewable to the user associated with the user profile. In some embodiments, the group-based communication interface for a user may have a dedicated section of the group-based communication interface that is viewable only to client devices associated with that user (e.g., a taskbar on one side of the group-based communication interface may include user profile information, group and/or channel memberships, and the like. In such an embodiment, a public user profile avatar 1310 may be displayed in the dedicated portion of the group-based communication interface. The public user profile avatar 1310 may be the same or similar to the user profile avatar 1230 discussed in reference to FIG. 12. In some cases, the user profile avatar 1230 of FIG. 12 may be different than the public user profile avatar 1310 shown in FIG. 13. For example, the public user profile avatar 1310 shown to the user associated with the user profile may include information relating to a user profile that the avatar rendering settings marked as private and therefore the user profile avatar may not be rendered to any other users in that exact form. The users that are able to view the public user profile avatar 1310 may be determined by the avatar rendering settings. In some embodiments, the additional information 1320 relating to the user status avatar shown in FIG. 13 may be similar to the additional information 1220 shown in FIG. 12. In some embodiments, additional and/or different information may be provided relating to the user status avatar (e.g., the user associated with the user profile may be able to see more information relating to the user status avatar).

Referring now to FIG. 14, an example group-based communication interface is provided that illustrates the selections of a user status avatar selection interface for a client device associated with a user. The selection by the user may be completed using a client device associated with the user. As shown in FIG. 14, the user status avatar may be determined by the group-based communication server 106 (e.g., the user data object from Google Calendar App account associated with the user indicates that the user is, or will be, "In a meeting"). In some embodiments the group-based communication server 106 may receive a selection input relating to the user status avatar, such as an indication to delete the current user status avatar (e.g., 1420), set a defined status period (e.g., 1430), and/or input a replacement user status avatar.

Referring now to FIG. 15, an illustrative group-based communication message 1510 that may be posted to one or more group(s) and/or channel(s) of the group-based communication system is provided. As shown in FIG. 15, the group-based communication server 106 comprises means, such as the processor 202, to render a one or more user profile avatars near a group-based communication message 1510 to indicate that one or more users are interacting with the group-based communication message (e.g., a picture of one or more users viewing a group-based communication message currently may be rendered near the group-based communication message, such as 1520 and 1530). In some embodiments, a user status avatar 1540 relating to the user may be displayed by interacting with the user profile avatar rendered near the group-based communication message 1510. This user status avatar 1540 may include the type of interaction with the post by the client device associated with the user. For example, the user status avatar 1540 may include an indication that a client device associated with the user is viewing a group-based communication message 1510, an indication that a client device associated with the user is typing a comment, information relating to the user status avatar associated with the user, and/or the like.

Example of Conflict Mapping for a Group-Based Communication Server

Referring now to FIG. 16, an example group-based communication server conflict mapping configuration is shown for conflict mapping of engagement data received from a plurality of sources. FIG. 16 and the discussion herein is an example scenario in which the engagement data received by the group-based communication server 106 from a plurality of user activity data log(s), external email resource(s), and/or validated email resource(s) may be conflicting and are meant to be illustrative only of an example method of conflict mapping by the group-based communication server and not in any way limiting of the scope of the present disclosure.

In an example embodiment, a group-based communication server 106 comprises means, such as the group-based communication circuitry 204 for receiving email resource engagement data (transmitted by an external email resource(s)) and/or validated resource engagement data (transmitted by a validated external resource(s)) relating to one or more of the scheduled events (e.g., one or more of the scheduled events of Blocks E1-E6). In addition, the group-based communication server 106 comprises means, such as the processor 202, to retrieve one or more user activity data logs from the group-based communication repository 107, the one or more user activity data logs may have user engagement data relating to the scheduled events (e.g., one or more of the scheduled events of Blocks E1-E6). The group-based communication server 106 comprises means, such as the processor 202, for determining one or more scheduled events based on the email resource engagement data, validated resource engagement data, and/or user engagement data. In the example shown in FIG. 16, each block (i.e., E1-E6) represent a scheduled event with the time periods for which the scheduled events are expected to occur with the time increasing from left to right (e.g., T1 is at a time after T0). In some embodiments, the group-based communication server 106 may be configured to prefer one or more scheduled events over other scheduled events. For example, an all-day event, such as a vacation day, may be given preference over shorter scheduled event, such as a meeting.

In this example, a group-based communication server 106 receives engagement data relating to Blocks E1 through E6 from a validated external resource, an external email resource, and a user activity data log. Based on the validated user data object(s) received from the validated external resource, the group-based communication server 106 comprises means, such as the processor 202, for detecting and/or determining the existence of the scheduled events of Blocks E1, E3, and E6. Additionally, based on the user data object(s) received from the external email resource, the group-based communication server 106 comprises means, such as the processor 202, for detecting and/or determining the existence of the scheduled event of Block E5. Based on the user engagement data retrieved from the group-based communication repository 107, the group-based communication server 106 comprises means, such as the processor 202, for detecting and/or determining the existence of a user engagement that indicates a scheduled event of Block E4. The group-based communication server 106 may include means, such as the user status avatar determination circuitry 206, to analyze a plurality of scheduled events to determine a user status avatar for a certain period of time.

At time zero (T0), E1 is the only scheduled event and therefore the group-based communication server 106 does not have to do any conflict mapping and the user status avatar may be determined by E1. For example, the validated user object may indicate that the scheduled event E1 is a meeting and the group-based communication server 106 may determine that the user status avatar should be "In a Meeting." In some embodiments, depending on the avatar rendering settings, the user status avatar may remain "In a Meeting" from T0 to T1, at which point in time the group-based communication server may determine whether a replacement user status avatar should be rendered due to indications of new scheduled events E2 and E5.

At T1, there are now three scheduled events, the previously running E1 and the newly "beginning" E2 and E3. In such a case, the avatar rendering settings may be configured to determine which scheduled event the user is participating. For example, the avatar rendering settings may indicate that when a user status avatar has been determined by a scheduled event with a defined status period, that the user status avatar should not be updated until the defined status period has expired (e.g., in such a case, then the user status avatar would remain set as "In a meeting" until E1 ends). In some embodiments, the determination of whether to update the user status avatar based on conflicting scheduled events may be based on the type of event and/or the source of the event information. For example, some scheduled events may have an indicated higher importance, either marked when received by the group-based communication server (e.g., an external email resource or validated external resource may allow a user to input a level of importance of the event that is then transmitted to the group-based communication system) or determined by the group-based communication server (e.g., the avatar rendering settings may include a hierarchy of event types, such as a prioritization of work related events over non-work related events). The higher importance of one scheduled event over another may indicate that a group-based communication server should weight that scheduled event more heavily than the other event(s), or in some cases exclusively use the higher importance event.

In some embodiments, the group-based communication server 106 may prioritize scheduled events that start at or near the same time that the previous user status avatar has expired (e.g., if a first meeting ends at 2, then a scheduled event for a second meeting that runs from 2 PM to 3 PM may be more reliable than a scheduled event for another meeting from 1:30 PM to 2:30 PM).

In some embodiments, the avatar rendering settings may also include a hierarchy of sources, which the group-based communication server may use in determining the user status avatar. For example, the avatar rendering settings may be configured to prefer user engagement data from a user activity data log over both email resource engagement data and validated resource engagement data in determining a user status avatar and the group-based communication server 106 may then default to a scheduled event indicated by a user activity data log when one is present (e.g., in such a case, at T1 the group-based communication server would update the user status avatar based on Block E5). Similar determinations may be made for T2 through T7 and may be different from user to user based on the avatar rendering settings. In some embodiments, there may be predefined components of the avatar rendering settings that the user may not be capable of, or allowed by the group-based communication server 106, altering (e.g., the group-based communication server may always weight the sources in a certain way that cannot be changed by a user). In some cases, the scheduled events from different sources may be for the same event (e.g., a "meeting" indicated by a user data object may be the same as a "conference call" indicated by a validated user data object). In some embodiments, the group-based communication server 106 comprises means, such as the processor 202, to render a scheduled event confirmation interface to transmit to the user for confirmation that a scheduled event is or was accurate (e.g., the scheduled event confirmation interface may ask the user whether the user attended a certain scheduled event at a certain time). In such an embodiment, the group-based communication server 106 may include means, such as the input/output circuitry 203, for receiving an input from the user approving or denying that a scheduled event is or was accurate.

Additional Example Group-Based Communication Server Operations

Referring now to FIG. 17, a flowchart is provided illustrating operations that are executed by an example embodiment of the group-based communication server 106 for determining the user associated with a user data object and/or a validated user data object. In some embodiments, the operations of the flowchart in FIG. 17 may occur after a user status avatar has been rendered for a defined status period and in some embodiments the operations of the flowchart in FIG. 17 may occur at other times not related to any defined status period (e.g., a user status avatar may be updated even though the current user status avatar does not have an expiration or the expiration has not yet occurred).

As shown in Block 1700 of FIG. 17, the group-based communication server 106 comprises means, such as the group-based communication circuitry 204, for receiving at least one user data object or validated user data object that comprises at least one external resource user identifier. The reception of Block 1700 may be the same as the reception discussed above in reference to Blocks 410 and 420 of FIG. 4.

As shown in Block 1710 of FIG. 17, the group-based communication server 106 comprises means, such as the user profile correlation circuitry 208, for associating the at least one user data object or validated user data object with the user activity data log based on the at least one external resource user identifier. The correlation of Block 1710 may be the same as the correlation discussed above in reference to Block 430 of FIG. 4.

Referring now to FIG. 18, a flowchart is provided illustrating operations that are executed by an example embodiment of the group-based communication server 106 for updating a user status avatar. In some embodiments, the operations of the flowchart in FIG. 18 may occur after a user status avatar has been rendered for a defined status period and in some embodiments the operations of the flowchart in FIG. 18 may occur at other times not related to any defined status period (e.g., a user status avatar may be updated even though the current user status avatar does not have an expiration or the expiration has not yet occurred).

As shown in Block 1800 of FIG. 18, the group-based communication server 106 comprises means, such as the input/output circuitry 203, for receiving selection input identifying a replacement user status avatar from the plurality of user status avatars. In some embodiments, the selection input may be received from a client device associated with a user. In an example embodiment, the selection input may be a selection by a client device associated with the user of a replacement user status avatar from a plurality of user status avatars rendered on the group-based communication interface (e.g., such as the selection options 920 shown in FIG. 9). In some embodiments, the client device associated with the user may provide a custom replacement user status avatar (e.g., FIG. 9 shows a block 910 for the user to input a custom status including words and/or emojis). In some embodiments, the client device associated with the user may provide indirect identifiers for a replacement user status avatar. For example, the selection input may indicate that the user may not be available for a certain period of time.

As shown in Block 1810 of FIG. 18, the group-based communication server 106 comprises means, such as the processor 202, for rendering the replacement user status avatar to the group-based communication interface to replace the user status avatar. Unless otherwise noted, the rendering of the replacement user status avatar may be the same or similar to the rendering discussed in reference to Block 540 of FIG. 5. In some embodiments, the selection input may alter the avatar rendering settings by including information relating to the groups and/or channels to which the replacement user status avatar is rendered.

Referring now to FIG. 19, a flowchart is provided illustrating operations that are executed by an example embodiment of the group-based communication server 106 for determining the user status avatar based on the geographic location of a client device associated with a user.

As shown in Block 1900 of FIG. 19, the group-based communication server 106 comprises means, such as the processor 202, for receiving geographic location data from a client device associated with the user activity data log. As discussed above in reference to the term client device, the one or more client devices that are associated with a user may include a global positioning system (GPS) receiver housed within the client device to generate location data (e.g., latitude and longitude coordinates) for the client device. The GPS receiver receives clock data transmitted by one or more geostationary satellites (a satellite in a known or knowable position) and/or one or more ground based transmitters (also in known or knowable positions), compares the received clock data, and computes the geographic location data, which represents a near real-time position for the client device. In some embodiments, the client device associated with a user may continuously transmit geographic location data to the group-based communication server 106 while the group-based communication system is active on the client device (e.g., for a mobile phone, the transmission of the geographic location data may occur when the group-based communication API is running, either in use and/or running in the background). Additionally or alternatively, the transmission of the geographic location data may be prompted by an interval of time (e.g., every hour), a system event (e.g., every time a client device opens the group-based communication system), a user interaction (e.g., a user may input an indication for the client device to transmit the geographic location data), and/or the like. In some instances, a client device associated with a user may be mobile, such as a mobile phone, and the GPS may allow the group-based communication server 106 to determine the user's location based on the location of the client device associated with the user. In some instances, the client device associated with a user may be stationary, such as a desktop computer, and an engagement of the group-based communication system on the stationary client device may indicate that the user is located at the position of the stationary client device.

As shown in Block 1910 of FIG. 19, the group-based communication server 106 comprises means, such as the user status avatar determination circuitry 206, for determining the user status avatar from the plurality of user status avatars based on the user activity data log, the geographic location data, and at least one of the at least one user data object or the at least one validated user data object. In some embodiments, the determination may be similar to the determination discussed in reference to Block 440 of FIG. 4. In such an embodiment, there may be an initial user status avatar determined based on the user activity data log and at least one of the at least one user data object or the at least one validated user data object, with the geographic location data being used in a verification step to determine whether a user is in a location that would allow the user status avatar to be reliable (e.g., the geographic location data may indicate that the user is out of the office and therefore not in a meeting at the office as indicated by the initial user status avatar). In some embodiments, the geographic location data may be used as a part of determining the user status avatar and not to verify the user status avatar. In such a case, the geographic location data may be used in conjunction with the user activity data log and the at least one of the at least one user data object or the at least one validated user data object in much the same manner that the other components interact as discussed in Block 440 of FIG. 4 (e.g., there may be a hierarchy of sources).

Referring now to FIG. 20, a flowchart is provided illustrating operations that are executed by an example embodiment of the group-based communication server 106 for determining the user status avatar based on the location of a client device associated with a user.

As shown in Block 2000 of FIG. 20, the group-based communication server 106 comprises means for, such as the processor 202, for receiving contextual location data from a client device associated with the user activity data log. As discussed above, some client devices associated with a user may be equipped with contextual location monitoring capabilities, such as cellular and/or wireless connections that provides proximate locations of a client device. For example, a client device associated with a user may be connected to a Wi-Fi connection associated with a company that indicates that the client device, and likely the user, is present in general area that the company Wi-Fi is present. For example, a client device associated with a Slack employee may be connected to the Slack Wi-Fi indicating that the user associated with the client device is somewhere within the Wi-Fi range. Additionally contextual location monitoring may include Bluetooth, RFID read events, barcode scan events, or the like. In some embodiments, the client device associated with a user may continuously transmit contextual location data to the group-based communication server 106 while the group-based communication system is active on the client device connected to a local or network source (e.g., for a mobile phone, the transmission of the contextual location data may occur when the mobile phone is connected to a Wi-Fi access point and the group-based communication API is running, either in use and/or running in the background). Additionally or alternatively, the transmission of the contextual location data may be prompted by an interval of time (e.g., every hour), a system event (e.g., every time a client device opens the group-based communication system or connects to a local or network source), a user interaction (e.g., a user may input an indication for the client device to transmit the geographic location data), and/or the like.

As shown in Block 2010 of FIG. 20, the group-based communication server 106 comprises means, such as the user status avatar determination circuitry 206, for determining the user status avatar from the plurality of user status avatars based on the user activity data log, the contextual location data, at least one of the at least one user data objects or the at least one validated user data objects. In some embodiments, the determination may be similar to the determination discussed in reference to Block 440 of FIG. 4. In such embodiments, there may be an initial user status avatar determined based on the user activity data log and at least one of the at least one user data object or the at least one validated user data object, with the contextual location data being used in a verification step to determine whether a user is in a location that would allow the user status avatar to be reliable (e.g., the contextual location data may indicate that the user is out of the office and therefore not in a meeting at the office as indicated by the initial user status avatar). In some embodiments, the contextual location data may be used as a part of determining the user status avatar and not to verify the user status avatar. In such a case, the contextual location data may be used in conjunction with the user activity data log and the at least one of the at least one user data object or the at least one validated user data object in much the same manner that the other components interact as discussed in Block 440 of FIG. 4 (e.g., there may be a hierarchy of sources).

In some embodiments, the group-based communication server 106 may include means, such as the processor 202, for receiving both geographic location data (e.g., FIG. 19) and contextual location data (e.g., FIG. 20) from one or more client devices associated with the user activity data log. In such an embodiment, the group-based communication server 106 may be configured to prefer one type of location data over the other (e.g., one of the geographic location data or the contextual location data may be more reliable). In some embodiments, the geographic location data and the contextual location data may be used in conjunction with the user activity data log(s) and, in some cases, the user data object(s) and/or validated user data object(s) to determine the user status avatar for a user, similarly to how described in various ways herein.

Embodiments of the subject matter described herein can be implemented in a computing system that comprises a back-end component, e.g., as an information/data server, or that comprises a middleware component, e.g., an application server, or that comprises a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of rendering information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As described above, FIGS. 3-5, and 17-22 illustrate flowcharts of apparatuses and methods according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. One or more non-transitory computer-readable media that store computer-executable instructions that, when executed by a processor, perform a method for managing a user availability status within a group-based communication system, the method comprising:
   retrieving a user activity data log corresponding to a user, the user activity data log comprising:
   user interaction data of the user associated with the group-based communication system; and one or more external data objects including external engagement data of the user from one or more external sources distinct from the group-based communication system;

identifying a user status indicator from a plurality of user status indicators based on the user activity data log, wherein each respective user status indicator of the plurality of user status indicators is associated with a default predefined status period defining a respective expiration time;

responsive to identifying the user status indicator, causing display of the user status indicator in a user interface associated with the group-based communication system, the user status indicator comprising presence information of the user determined based on the user activity data log;

receiving one or more user selections from the user indicating a replacement user status indicator;

responsive to receiving the one or more user selections, identifying the replacement user status indicator from the plurality of user status indicators; and replacing the user status indicator with the replacement user status indicator in the user interface, wherein the replacement user status indicator is associated with a user-selected status period defining an expiration time of the replacement user status indicator.

2. The one or more non-transitory computer-readable media of claim 1, wherein the default predefined status period defining the expiration time of the user status indicator is selected based on a type of the user status indicator.

3. The one or more non-transitory computer-readable media of claim 2, the method further comprising:

receiving a user input comprising a selection of the user-selected status period defining the expiration time of the replacement user status indicator.

4. The one or more non-transitory computer-readable media of claim 3, wherein the one or more user selections comprises a user selection to adjust the user-selected status period, further comprising:

adjusting the user-selected status period of the replacement user status indicator based on the one or more user selections to produce an adjusted status period.

5. The one or more non-transitory computer-readable media of claim 4, further comprising:

updating the replacement user status indicator with an indication of the adjusted status period.

6. The one or more non-transitory computer-readable media of claim 5, further comprising:

upon expiration of the adjusted status period of the user status indicator, automatically replacing the user status indicator with a default user status indicator in the user interface.

7. The one or more non-transitory computer-readable media of claim 1, wherein the one or more user selections comprises a privacy level selection indicating one or more selected users of the group-based communication system who are allowed to view the replacement user status indicator within the user interface, further comprising:

allowing display of the replacement user status indicator to the one or more selected users; and suppressing display of the replacement user status indicator to one or more other users of the group-based communication system.

8. A method for managing a user availability status within a group-based communication system, the method comprising:

retrieving a user activity data log corresponding to a user, the user activity data log comprising:

user interaction data of the user associated with the group-based communication system; and one or more external data objects including external engagement data of the user from one or more external sources distinct from the group-based communication system;

identifying a user status indicator from a plurality of user status indicators based on the user activity data log, wherein each respective user status indicator of the plurality of user status indicators is associated with a default predefined status period defining a respective expiration time;

responsive to identifying the user status indicator, causing display of the user status indicator in a user interface associated with the group-based communication system, the user status indicator comprising presence information of the user determined based on the user activity data log;

receiving one or more user selections from the user indicating a replacement user status indicator;

responsive to receiving the one or more user selections, identifying the replacement user status indicator from the plurality of user status indicators; and replacing the user status indicator with the replacement user status indicator in the user interface, wherein the replacement user status indicator is associated with a user-selected status period defining an expiration time of the replacement user status indicator.

9. The method of claim 8, wherein the default predefined status period defining the expiration time of the user status indicator is selected based on a type of the user status indicator.

10. The method of claim 9, further comprising:

receiving a user input comprising a selection of the user-selected status period defining the expiration time of the replacement user status indicator.

11. The method of claim 10, wherein the one or more user selections comprises a user selection to adjust the user-selected status period, further comprising:

adjusting the user-selected status period of the replacement user status indicator based on the one or more user selections to produce an adjusted status period.

12. The method of claim 11, further comprising:

updating the replacement user status indicator with an indication of the adjusted status period.

13. The method of claim 12, further comprising:

upon expiration of the adjusted status period of the user status indicator, automatically replacing the user status indicator with a default user status indicator in the user interface.

14. The method of claim 8, wherein the one or more user selections comprises a privacy level selection indicating one or more selected users of the group-based communication system who are allowed to view the replacement user status indicator within the user interface, further comprising:

allowing display of the replacement user status indicator to the one or more selected users; and suppressing display of the replacement user status indicator to one or more other users of the group-based communication system.

15. A system comprising at least one processor and at least one non-transitory memory storing computer executable instructions that when executed by the at least one processor perform a method for managing a user availability status within a group-based communication system, the method comprising:

retrieving a user activity data log corresponding to a user, the user activity data log comprising:

user interaction data of the user associated with the group-based communication system; and one or more external data objects including external engagement data of the user from one or more external sources distinct from the group-based communication system;

identifying a user status indicator from a plurality of user status indicators based on the user activity data log, wherein each respective user status indicator of the plurality of user status indicators is associated with a default predefined status period defining a respective expiration time;

responsive to identifying the user status indicator, causing display of the user status indicator in a user interface associated with the group-based communication system, the user status indicator comprising presence information of the user determined based on the user activity data log;

receiving one or more user selections from the user indicating a replacement user status indicator;

responsive to receiving the one or more user selections, identifying the replacement user status indicator from the plurality of user status indicators; and replacing the user status indicator with the replacement user status indicator in the user interface, wherein the replacement user status indicator is associated with a user-selected status period defining an expiration time of the replacement user status indicator.

16. The system of claim 15, wherein the default predefined status period defining the expiration time of the user status indicator is selected based on a type of the user status indicator.

17. The system of claim 16, the method further comprising:

receiving a user input comprising a selection of the user-selected status period defining the expiration time of the replacement user status indicator.

18. The system of claim 17, wherein the one or more user selections comprises a user selection to adjust the user-selected status period, further comprising:

adjusting the user-selected status period of the replacement user status indicator based on the one or more user selections to produce an adjusted status period.

19. The system of claim 18, further comprising:

updating the replacement user status indicator with an indication of the adjusted status period.

20. The system of claim 19, further comprising:

upon expiration of the adjusted status period of the user status indicator, automatically replacing the user status indicator with a default user status indicator in the user interface.

* * * * *